United States Patent
Mirbagheri et al.

(10) Patent No.: US 9,397,769 B2
(45) Date of Patent: Jul. 19, 2016

(54) INTERFERENCE MITIGATION FOR POSITIONING REFERENCE SIGNALS

(71) Applicant: QUALCOMM Incorporated, San Diego, CA (US)

(72) Inventors: Arash Mirbagheri, San Diego, CA (US); Shenqiu Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/864,751

(22) Filed: Sep. 24, 2015

(65) Prior Publication Data

US 2016/0156424 A1  Jun. 2, 2016

Related U.S. Application Data

(60) Provisional application No. 62/085,420, filed on Nov. 28, 2014.

(51) Int. Cl.
 *H04B 17/336* (2015.01)
 *H04L 27/26* (2006.01)

(52) U.S. Cl.
 CPC .......... *H04B 17/336* (2015.01); *H04L 27/2628* (2013.01)

(58) Field of Classification Search
 CPC ... H04W 64/00; H04W 24/10; H04W 72/082; H04W 4/02; H04W 72/1226; G01S 5/0009; H04B 15/00; H04B 17/336; H04L 27/2628
 See application file for complete search history.

(56) References Cited

U.S. PATENT DOCUMENTS

| | | | |
|---|---|---|---|
| 6,298,050 B1 * | 10/2001 | van Heeswyk | H04B 1/7107 370/335 |
| 7,940,740 B2 | 5/2011 | Krishnamurthy et al. | |
| 8,059,700 B2 * | 11/2011 | Lopez-Risueno | G01C 21/206 375/135 |
| 8,165,586 B2 | 4/2012 | Krishnamurthy et al. | |
| 8,675,560 B2 | 3/2014 | Yoo et al. | |
| 2004/0208238 A1 * | 10/2004 | Thomas | G01S 5/0215 375/148 |
| 2010/0232543 A1 | 9/2010 | Sampath et al. | |
| 2010/0273506 A1 | 10/2010 | Stern-Berkowitz et al. | |
| 2011/0124347 A1 | 5/2011 | Chen et al. | |

(Continued)

FOREIGN PATENT DOCUMENTS

| | | |
|---|---|---|
| WO | 2004015878 A2 | 2/2004 |
| WO | 2014125491 A1 | 8/2014 |

OTHER PUBLICATIONS

Fischer, Sven, "Observed Time Difference of Arrival (OTDOA) Positioning in 3GPP LTE," Qualcomm Technologies, Inc., Jun. 6, 2014, 62 pages.

(Continued)

*Primary Examiner* — Vineeta Panwalkar
(74) *Attorney, Agent, or Firm* — Silicon Valley Patent Group LLP

(57) ABSTRACT

Techniques are provided, which may be used for determining a position of a user equipment (mobile device). In certain example implementations, tones in positioning signals from one or more sources that may interfere with certain positioning signals be estimated and some form of interference mitigation may be applied, which may better enable the user equipment to acquire certain other positioning signals that may be useful in determining a position of the user equipment.

30 Claims, 11 Drawing Sheets

(56) References Cited

U.S. PATENT DOCUMENTS

| | | | |
|---|---|---|---|
| 2011/0312355 A1 | 12/2011 | Cheng et al. | |
| 2012/0099503 A1* | 4/2012 | Guo | G01S 5/02 370/312 |
| 2012/0263247 A1 | 10/2012 | Bhattad et al. | |
| 2013/0115986 A1 | 5/2013 | Mueck et al. | |

OTHER PUBLICATIONS

International Search Report and Written Opinion—PCT/US2015/058143—ISA/EPO—Jan. 28, 2016.

Mensing C., et al., "Interference-Aware Location Estimation in Cellular OFDM Communications Systems", 2009 IEEE International Conference on Communications, Jun. 1, 2009, pp. 1-6, XP055241225, DOI : 10 . 1109/ICC .2009.5199097 abstract p. 1, right-hand column, line 21-line 28 p. 2, right-hand column, line 3-line 15 p. 3, left-hand column p. 4, left-hand column, line 17-line 27.

Del Peral-Rosado J.A., et al., "Analysis of Positioning Capabilities of 3GPP LTE," Proceedings of the 25th International Technical Meeting of The Satellite Division of the Institute of Navigation (ION GNSS 2012), 2012, 10 pages.

* cited by examiner

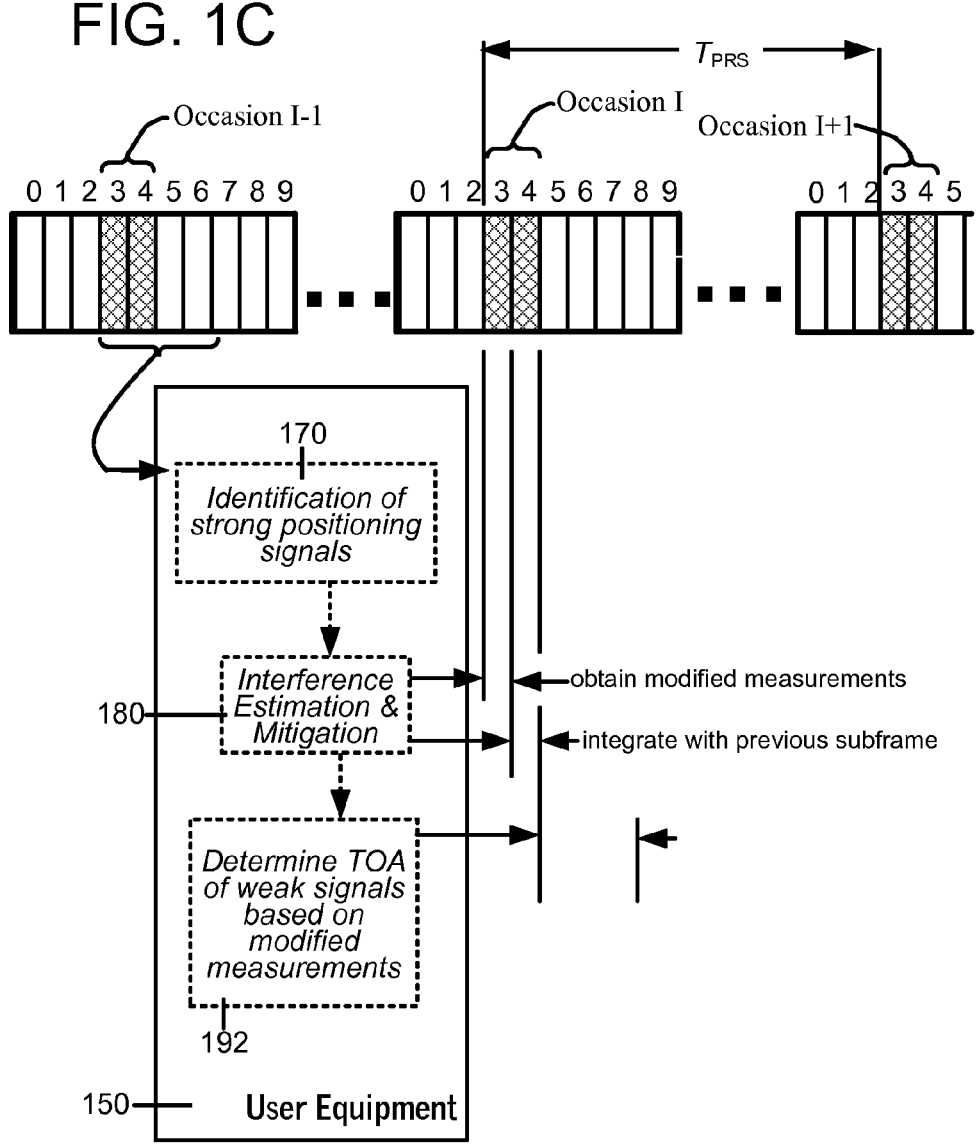

INTERFERENCE MITIGATION FOR POSITIONING REFERENCE SIGNALS

CROSS-REFERENCE TO PROVISIONAL APPLICATION

This application claims the benefit of and priority to U.S. Provisional Application No. 62/085,420 filed on Nov. 28, 2014 and entitled "INTERFERENCE ESTIMATION AND CANCELLATION FOR POSITIONING REFERENCE SIGNALS", which is incorporated herein by reference in its entirety.

FIELD

This patent application relates to techniques for use in determining, at least in part, a position of a user equipment, and more specifically to devices and methods that may be used to mitigate (e.g., alter, reduce, cancel) interference in positioning signals received by the user equipment for use in positioning.

BACKGROUND

Long Term Evolution (LTE), defined in a standard known as $3^{rd}$ Generation Partnership Project (3GPP), describes a measurement by a mobile device of a difference in times of arrival of signals from two base stations. To enable detection of signals from multiple base stations, a signal in LTE is dedicated to positioning, known as a positioning reference signal (PRS). Each PRS signal contains a specific pattern assigned thereto, e.g. based on an identifier of a base station, known as the Physical Cell Identity (PCID or PCI). Tones in the PRS signal may employ a frequency re-use factor of 6. The re-use factor may be, for example, determined by v_shift=mod(PCID, 6). Two or more base stations with a common mod(PCID, 6) may transmit PRS tones which collide, causing interference. Scrambling codes may distinguish a PRS signal from among multiple PRS signals received at a mobile device in a common frequency bin, from multiple base stations having the same mod(PCID, 6). Use of scrambling codes may provide 20 dB (average) to 30 dB (best case) isolation, which can be insufficient to overcome a power differential due to distances of a mobile device from its serving cell and the other cells. Such a power differential may cause PRS signals from one or more base stations to drown in an elevated noise floor, and not be detected.

SUMMARY

In accordance with certain aspects of the present description, it may be recognized that tones in positioning signals from one or more sources (e.g. base stations) that are sensed strongly ("strong positioning signals") may be estimated in a specific cyclical period (e.g. duration of a positioning occasion) that occurs in an LTE signal and mitigated in the same specific cyclical period (e.g. within the same positioning occasion), which may enable a mobile device or other such user equipment (UE) which performs the estimation and mitigation to measure one or more additional positioning signals that are sensed weakly relative to the one or more strong positioning signals.

In certain example implementations, a wireless transceiver in a user equipment may measure a plurality of positioning signals that are synchronized relative to one another, to obtain initial positioning measurements. In the same user equipment, one or more processor(s) may estimate a plurality of tones of one or more interfering station(s), (1) based on the initial positioning measurements measured in a current cyclical period, and (2) based on identification of the one or more interfering station(s). The same one or more processor(s) may additionally mitigate at least one of the plurality of tones of one or more interfering station(s), from the initial positioning measurements measured in the current cyclical period (used in estimating the interfering station(s) tones), to obtain modified positioning measurements.

Before, during, or after the above-described example interference estimation and mitigation process, the one or more processors may determine times of arrival, at the user equipment, of positioning signals from the one or more interfering station(s), based at least on the initial positioning measurements (e.g. in a normal manner of processing positioning signals, in accordance with LTE). Additionally, after the above-described interference estimation and mitigation process, the one or more processors may determine times of arrival, at the user equipment, of positioning signals from the one or more weak station(s), based at least on the modified positioning measurements. Further, one or more processor(s) may use the arrival times of the one or more interfering station(s) positioning signals and the arrival times of the one or more weak station(s) positioning signals, to compute, at least in part, a position of the user equipment.

In certain embodiments, one or more interfering stations may be identified prior to the current cyclical period, for example, by applying a test of interference to additional initial positioning measurements that may be measured in one or more earlier cyclical period(s), e.g. based on signal-to-noise ratios (SNRs) of positioning signals. Specifically, some embodiments may check whether a signal-to-noise ratio of a positioning signal from a strongest station is greater than a first threshold and additionally check whether another signal-to-noise ratio of another positioning signal from another station is less than a second threshold (e.g. noise threshold). In certain example implementations, in response to having both the just-described conditions met, the strongest station may be identified as an interfering station, and the above-described example interference estimation and mitigation process or the like may be performed, e.g., followed by position determination based on arrival times of strong and weak positioning signals. In certain example embodiments, should one or more condition(s) fail to be met, such an interference estimation and mitigation process may not be performed. Hence, in such a case, position determination may, for example, be based only on arrival times of strong positioning signals (e.g. when positioning signals with SNRs above noise threshold are at least three in number).

It is to be understood that several other aspects of the embodiments will become readily apparent to those skilled in the art from the description herein, wherein it is shown and described various aspects by way of illustration. The drawings and detailed description below are to be regarded as illustrative in nature and not as restrictive.

BRIEF DESCRIPTION OF DRAWINGS

FIG. 1C illustrates, in timing diagrams, performance of operation 180 of FIG. 1B (interference estimation and mitigation) within a single cyclical period, with both acts 170 and 180 being performed in a single user equipment in some embodiments.

DETAILED DESCRIPTION

In certain instances, a specific example of a strong interfering cell in the context of a PRS detection capability may be a serving cell of a mobile device or user equipment (UE). A UE (e.g. UE 150 in FIG. 1A) may select a strongest base station (e.g. eNodeB 151A in FIG. 1A) of the strongest cell in its surrounding environment to be its serving base station (or serving cell). Compared to other neighboring cells (e.g. served by eNodeB 151I, and eNodeB 151N), a serving cell (e.g. served by eNodeB 151A in FIG. 1A) may typically be much stronger. Hence, in accordance with certain aspects of the present description and as described in greater detail herein, a frequency bin corresponding to v_shift value of the serving cell (e.g. eNodeB 151A in FIG. 1A) may be interference limited, and a neighbor cell with the same v_shift value as the serving cell may have poor detection rates. Moreover, in accordance with certain aspects of the present description and as described in greater detail herein, if a UE (e.g. UE 150 in FIG. 1A) is closer in distance to the serving cell (e.g. eNodeB 151A in FIG. 1A) relative to other cells with the same v_shift value, such interference problems may be further aggravated. In contrast, in accordance with certain aspects of the present description and as described in greater detail herein, if a UE has a serving cell that is only a few dB's stronger than the neighboring cells with the same v_shift value, such interference problems may be less severe.

Figure 1A:
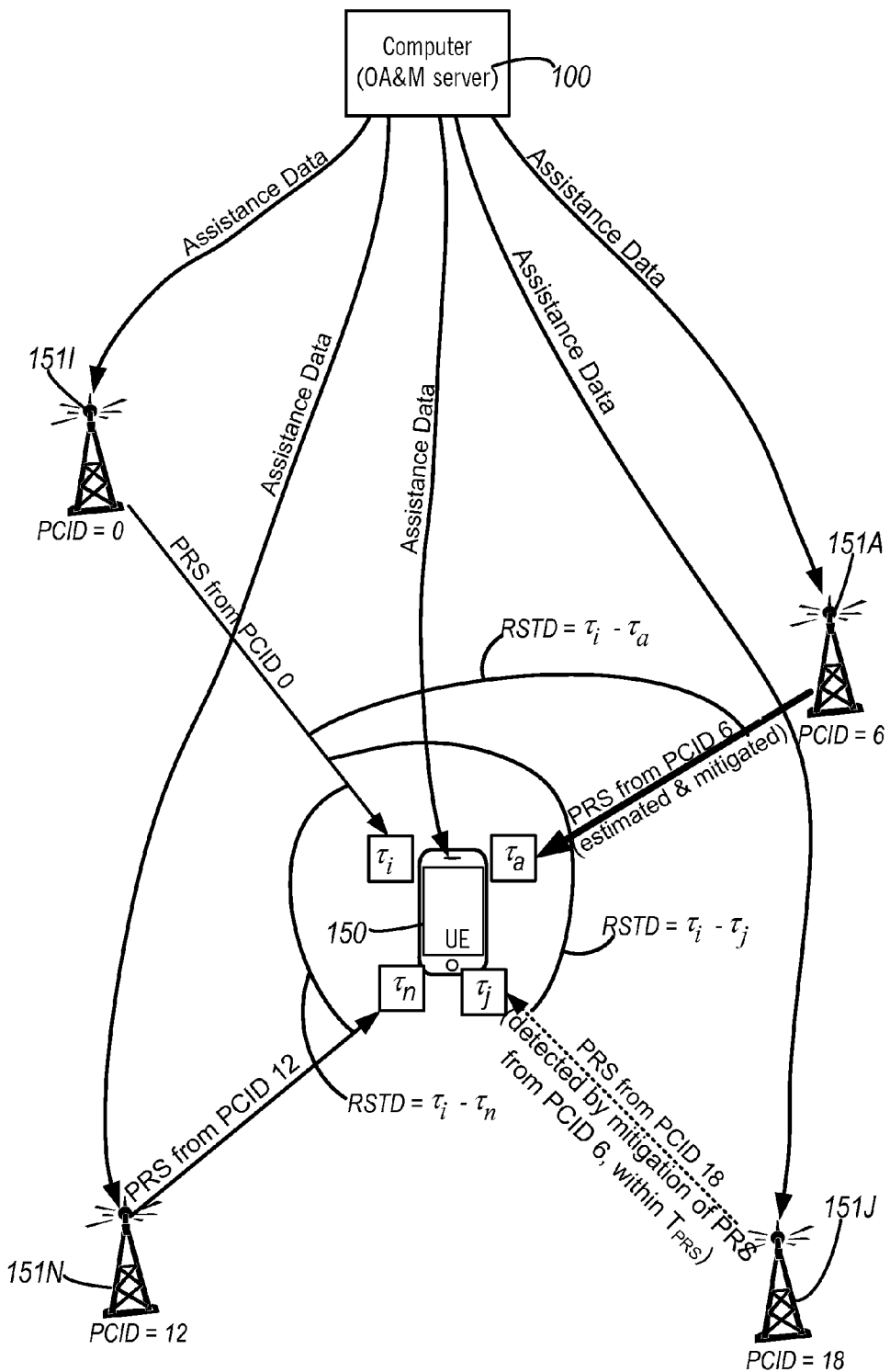
FIG. 1A is an example wireless communications environment of a user equipment, in several described embodiments.
Figure 1B:
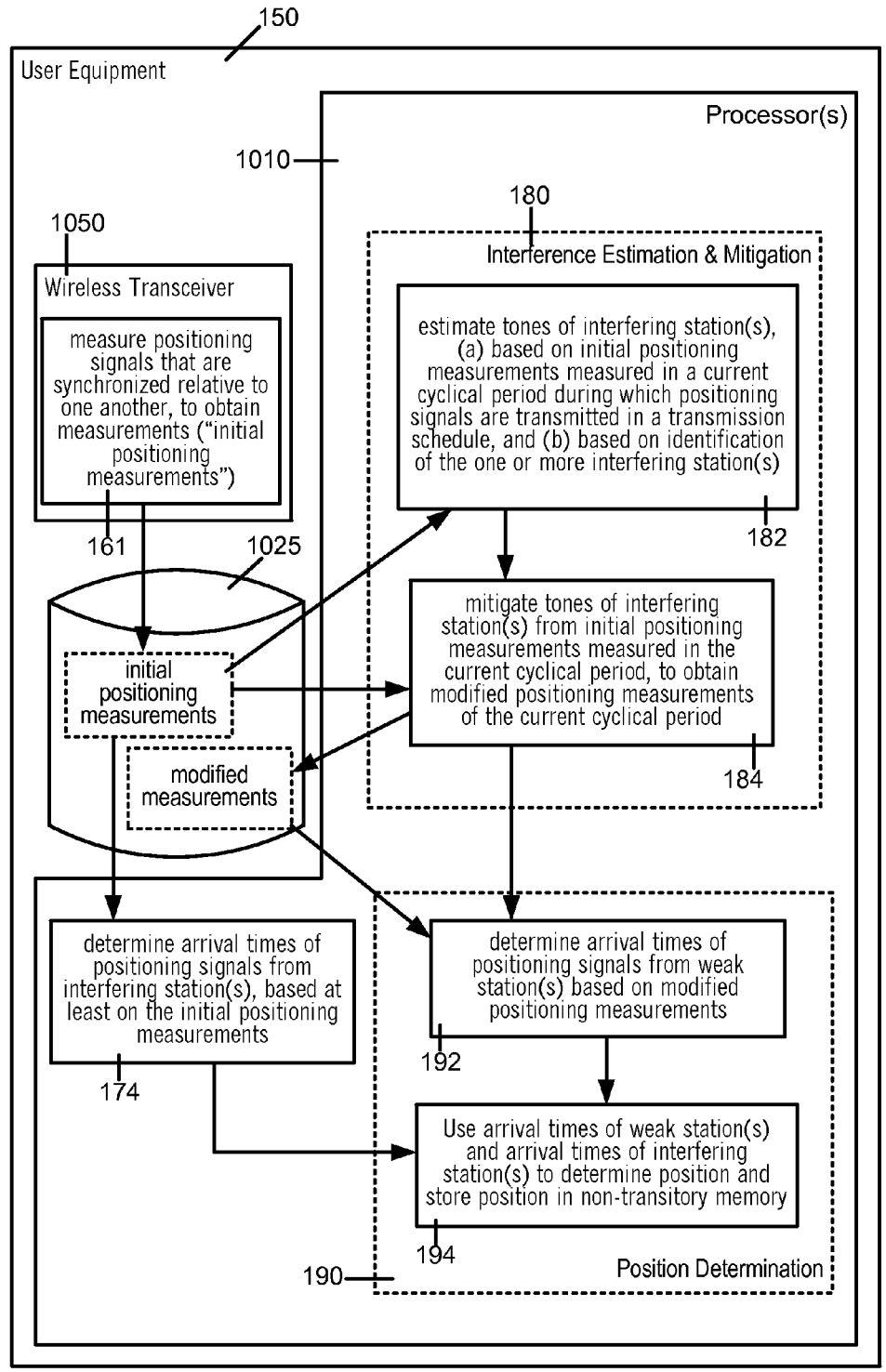
FIG. 1B illustrates, in a flow chart, acts performed by the user equipment of FIG. 1A, in some illustrative embodiments.

In several aspects of described embodiments, a procedure for determining a UE's position includes identification of strong interfering cells using assistance information, as illustrated in FIG. 1B. Specifically, in an OTDOA session, a wireless transceiver 1050 (which is included within a UE 150, see FIG. 6) performs an act 161 to measure positioning signals that are synchronized relative to one another, to obtain measurements ("initial positioning measurements"). In certain instances, initial positioning measurements may comprise "raw positioning measurements". Hence, as used herein, initial positioning measurements may comprise data that has been processed in some manner and/or data that may be in an unprocessed form (e.g., raw). Depending on the embodiment, the initial positioning measurements may be stored in a storage device 1025, for subsequent use by one or more processor(s) 1010 in UE 150. The one or more processor(s) 1010 in UE 150 may be configured to use certain of the initial positioning measurements from wireless transceiver 1050, which are made within a cyclical period in a transmission schedule of positioning signals (e.g. made over a single positioning occasion), to determine position, as discussed below. To obtain the initial positioning measurements, positioning signals may be measured by a wireless transceiver 1050 in an act 161 (FIG. 1B), from multiple stations that use a common frequency shift (i.e. the same v_shift value), and likely to interfere with one another. The initial positioning measurements made in a current cyclical period may be stored in a storage device 1025, for use by one or more processor(s) 1010, in interference estimation and mitigation in operation 180, as described below.

The strength of a positioning signal may depend on the distance of UE 150 to a station (e.g. eNodeB) of that cell, propagation channel loss, antenna orientation, and shadowing effects, just to name a few examples. This information may not be known apriori to UE 150. It may be relatively safe to assume that a serving cell is the strongest cell in the OTDOA cell list, however, in accordance with certain aspects of the present description, even this knowledge may be insufficient, to enable mitigation of strong PRS signals. If a PRS signal from eNodeB 151A (FIG. 1A) of a strong cell ("strong PRS signal") is only a few dB's stronger than PRS signals from eNodeB 151I, eNodeB 151J, and eNodeB 151N of neighbor cells, there may be little if any advantage obtained from some of the example PRS interference mitigation techniques presented herein, e.g., when use of a scrambling code delivers at least 20 dB isolation.

In an example illustrated in FIG. 1A, each of eNodeB 151A, eNodeB 151I, eNodeB 151J, and eNodeB 151N have the same v_shift value. Hence, a PRS signal from a station (e.g. eNodeB 151A) is sensed very strongly ("strong positioning signal") in UE 150 by a wireless transceiver 1050 therein (see FIG. 6), in a particular positioning occasion (e.g. $N_{PRS}$ consecutive subframes) that occurs at a periodicity of $T_{PRS}$ of an LTE signal, which interferes with and causes the PRS signals from other stations (e.g. eNodeB 151I, eNodeB 151J, and eNodeB 151N) in the same particular positioning occasion to be drowned in noise. Hence, UE 150 may be configured to perform all acts of interference estimation and mitigation in operation 180 on measurements made within a single cyclical period (e.g. a positioning occasion of a PRS signal which may conform to LTE, and in this example the duration of the positioning occasion may be a predetermined number of subframes $N_{PRS}$).

More specifically, the duration of a cyclical period, over which initial positioning measurements made by wireless transceiver 1050 are used by the one or more processor(s) 1010 to perform interference estimation and mitigation in operation 180, can be different. In an example illustrated in FIG. 1C, positioning occasions may occur in a transmission schedule in accordance with LTE, with a periodicity of $T_{PRS}$, whereby a first subframe of one positioning occasion is separated from the first subframe of a next positioning occasion by $T_{PRS}$ subframes. The period $T_{PRS}$ is defined in 3GPP TS 36.211, and can be, for example, 160, 320, 640, or 1280 subframes (or milli-seconds), depending on the implementation. In an example shown in FIG. 1C, interference estimation and mitigation in operation 180 is performed in two subframes, which are both included in a cyclical period of $N_{PRS}$=2 subframes that occur consecutively, and form a single positioning occasion. Although $N_{PRS}$=2 is illustrated in FIG. 1C, the predetermined number $N_{PRS}$ can be 1, 2, 4 or 6 subframes, in other such examples.

In several embodiments, one or more processor(s) 1010 in a UE 150 (FIG. 1B) are configured to perform operation 180 which includes acts 182 and 184, followed by a position determination in operation 190 which includes acts 192 and 194, as follows. Specifically, operation 180 uses initial positioning measurements from wireless transceiver 1050, which may be made within a cyclical period (also called "current cyclical period") by wireless transceiver 1050 in UE 150, as follows. In act 182, the one or more processor(s) 1010 estimate tones of one or more interfering station(s), based on the just-described initial positioning measurements (e.g. obtained from storage device 1025), and based on identification of the one or more interfering station(s) (which may also be obtained from storage device 1025). Depending on the embodiment, act 182 may include, for example, one or more of: scaling, pruning and noise-thresholding. Thus, in certain embodiments, an interfering station's tones may be reconstructed in act 182, e.g. based on assistance information (e.g. without modeling an interfering station's positioning signal within UE 150).

Thereafter, in an act 184, the same one or more processor(s) 1010 within UE 150 cancel (or reduce or alter) the tones of the one or more interfering station(s) (obtained by reconstruction in act 182) from the same initial positioning measurements which were measured in the current cyclical period (and used in estimating the interfering station(s) tones), to obtain modified positioning measurements of the current cyclical period. In some embodiments, acts 182 and 184 are performed in a sequential manner, one after another, on initial positioning measurements measured in a single subframe, e.g. stored in a copy of a sample buffer in storage device 1025, so that on completion of act 184 this copy stores modified positioning measurements. As illustrated in FIG. 1C, in some embodiments, acts 182 and 184 may be repeated, with modified positioning measurements obtained after the repetition being integrated with modified positioning measurements in the previous subframe.

Referring back to FIG. 1B, the modified measurements (stored in storage device 1025) are used by the one or more processor(s) 1010 in a position determination operation 190, which includes acts 192 and 194. In an act 192, the one or more processor(s) 1010 determine times of arrival of positioning signals of weak station(s) at UE 150, based modified positioning measurements output by act 184. Additionally, in an act 174, which may be performed at any time after performance of act 161, the one or more processor(s) 1010 use the initial positioning measurements measured in the current cyclical period (e.g. stored in a sample buffer in storage device 1025), to determine times of arrival of positioning signals of interfering station(s) at UE 150. The arrival times of positioning signals of the weak station(s) obtained from act 192 (FIG. 1B) and the arrival times of positioning signals of the interfering station(s) obtained from act 172 (FIG. 1B) are used in an act 194 (FIG. 1B), e.g. to determine position of UE 150 in a normal manner, followed by storing the position in memory 1035 (FIG. 6), which may be implemented as any non-transitory memory.

Accordingly, in some embodiments of UE 150 (FIG. 1A) of the type described herein estimate the strongest PRS signal (e.g. from eNodeB 151A with PCID 6) within the specific period $N_{PRS}$ (e.g. in a positioning occasion, as shown in FIG. 1C), and also mitigate (e.g. cancel, reduce or alter) the strongest PRS signal (e.g. from eNodeB 151A with PCID 6) within that same specific period $N_{PRS}$ (e.g. in the same positioning occasion, as shown in FIG. 1C). FIG. 1C additionally illustrates an operation 170 of identification of strong positioning signals, which may be marked as interfering signal(s) in some embodiments, based on measurements of positioning signals in one or more cyclical periods (e.g. occasion I−1), which occur prior to a current cyclical period (e.g. occasion I) in which an operation 180 of interference estimation and mitigation is performed as described above.

Figure 1D:
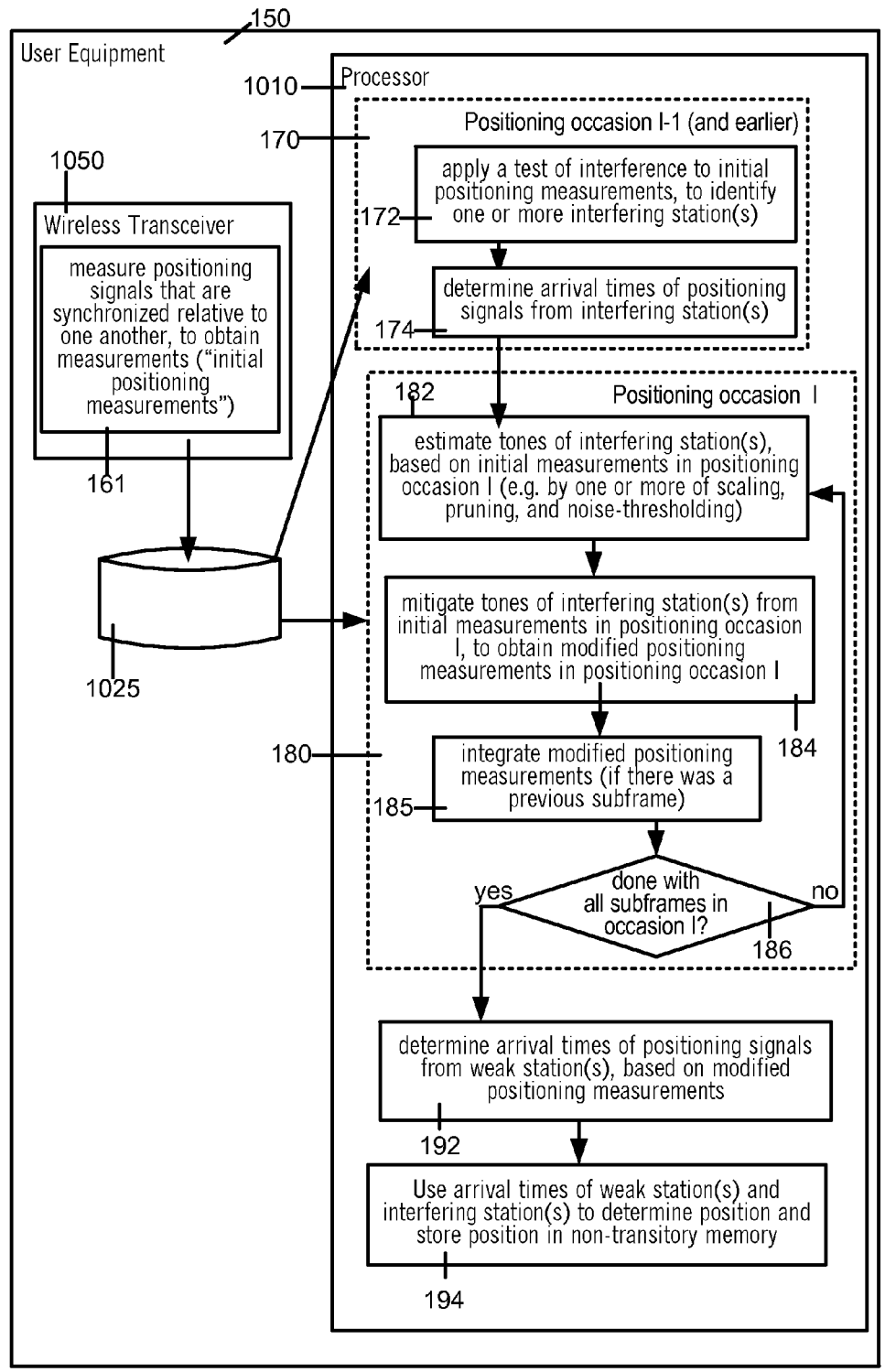
FIG. 1D illustrates, in a flow chart, acts performed by the user equipment of FIG. 1A, in some illustrative embodiments.

More specifically, as illustrated in FIG. 1D, in an act 172, the one or more processor(s) 1010 apply a test of interference to the initial positioning measurements that are made within an earlier cyclical period (e.g. occasion I−1), to identify as interfering, one or more station(s) identified in a list received in assistance information. For example, in act 172, a strongest station in the initial positioning measurements may be identified as interfering, when one or more first threshold(s) Th1 are exceeded by signal-to-noise ratio(s) of positioning signals from the strongest station and when one or more second threshold(s) Th2 are above signal-to-noise ratio(s) of positioning signals from one or more weak station(s), with all these station(s) being identified in the list.

When both the just-described conditions are met, one or more strongest station(s), which meet the first threshold-testing condition (based on Th1), may be identified as interfering station(s), and then interference estimation and mitigation in operation 180 is performed. When both the above-described threshold-testing conditions are not met (e.g. if only one of these two conditions is met), interference estimation and mitigation in operation 180 may not be performed, and in such a case, position determination in act 194 may be based only on arrival times of strong positioning signals (e.g. when positioning signals with SNRs above noise threshold are at least three in number). Therefore, in such embodiments, the result of act 172 (FIG. 1D) is used to enable or disable the operation 180. Thus, in several such embodiments, a strong signal may be identified (or not identified) as an interferer, in operation 170 (FIG. 1C) which is performed at the beginning of a session to determine position, e.g. within the first one or two occasions, which may be occasions I−1 and I−2, and during operation 170 all measurements are made in a normal manner (and no attempt is made by processor(s) 1010 to estimate, reconstruct and mitigate (e.g. cancel, reduce or alter) interference).

During such an operation 170 (FIG. 1D), some embodiments of processor(s) 1010 may estimate the SNR of each positioning signal, compare these estimated SNRs using the above-described two threshold-testing conditions (based on thresholds Th1 and Th2), to determine and mark any positioning signal(s) as "strong" interferers, which need to be mitigated (e.g. cancelled, reduced or altered) in operation 180. In performing the operation 170, for the second threshold-testing condition (based on noise threshold, e.g. Th2) to be satisfied, processor(s) 1010 may not need an accurate SNR estimation of weak positioning signal(s). Specifically, when a positioning signal is above noise floor (e.g. Th2), then processor(s) 1010 is configured to determine that this positioning signal's SNR is reliable, which is then used in ranking positioning signals, for use in identifying one or more strong signal(s) by use of the first threshold-testing condition (based on threshold Th1). One or more such highest ranked positioning signal(s) may be identified by processor(s) 1010 as interfering in operation 170, for use in interference mitigation in operation 180, when the second threshold-testing condition is also met, by at least one positioning signal. When a positioning signal is equal to or below the noise floor (e.g. drowned in noise), processor(s) 1010 is configured to determine that the SNR value of this positioning signal is equivalent to noise SNR, and in this case the second threshold-testing condition (based on threshold Th2) is determined to be met.

In some embodiments, prior to act 172 (FIG. 1D), processor(s) 1010 in UE 150 may obtain assistance information in a normal manner, e.g. from a computer 100 (FIG. 1A) that supports one or more centralized functions (e.g. OA&M computer). The assistance information may include, for example, a list of neighbor cells (OTDOA cell list) with detailed information about their PRS configuration, PCI, and expected delay and search window with respect to a reference cell. Receipt of assistance information by UE 150 facilitates PRS processing and Reference Signal Time Difference (RSTD) measurement at UE 150, e.g. as time difference of arrival (TDOA) between two PRS signals. Moreover, in some embodiments, after act 172 (FIG. 1D), processor(s) 1010 in UE 150 may perform act 174, to determine arrival times of the positioning signals from station(s), which were identified as interfering in act 172.

Act 172 (FIG. 1D) may be followed by operation 180 (FIG. 1D) which is similar or identical to operation 180 (FIG. 1B) described above, except for the following. Specifically, in some embodiments, act 182 and act 184 are performed on initial positioning measurements made in a single subframe (e.g. subframe #3 of occasion I shown in FIG. 1C), and in an act 185, processor(s) 1010 in UE 150 may integrate the modified positioning measurements obtained from act 184 with corresponding modified positioning measurements obtained from an earlier iteration of act 184, if there was a previous subframe (when there is no earlier iteration, and no previous subframe, no integration is done). Thereafter, in an act 186 (FIG. 1D), processor(s) 1010 in UE 150 may check if all subframes in the current occasion I have been processed and if not, return to the act 182 (described above). When all subframes in the current occasion I have been processed, the answer in act 186 is yes, and processor(s) 1010 may perform position determination in operation 190, by performing the acts 192 and 194.

Hence, based on PRS interference mitigation, by position determination in operation 190, UE 150 measures an arrival time $\tau_j$ of the PRS signal from eNodeB 151J with PCID 18, by mitigation of the strongest PRS signal (e.g. within a fraction of cyclical period $T_{PRS}$). Also while mitigating (e.g. by cancelling, reducing or altering) the strongest PRS signal (e.g. within the fraction of cyclical period $T_{PRS}$), UE 150 measures the arrival times $\tau_i$ and $\tau_n$ of the PRS signals from eNodeB 151I (with PCID 0) and eNodeB 151N (with PCID 12). At this stage, in some embodiments of act 192 (FIG. 1B), UE 150 may compute three Time Difference of Arrival values, $\tau_i-\tau_j$, $\tau_i-\tau_n$, and $\tau_i-\tau_a$ (this last TDOA value being based on measurement of an arrival time $\tau_a$ of the PRS signal (which is the strongest PRS signal) from eNodeB 151A with PCID 6, measured in the same cyclical period $T_{PRS}$ prior to mitigation), which are used as RSTDs, to compute the position of UE 150 in a normal manner.

In some embodiments, operations related to a subframe N's sample buffer are performed by processor 1010 during a time period in which subframe N+1 is being received by wireless transceiver 1050. In such embodiments, estimation in act 182 (FIG. 1D) is performed based on initial positioning measurements made by wireless transceiver 1050 in the entire subframe N, and mitigation in act 182 (FIG. 1D) is also performed on the initial positioning measurements made by wireless transceiver 1050 in the entire subframe N.

In an illustrative example shown in FIG. 1C, each occasion I has two subframes. In this example, during occasion I, while subframe 3 is being received in positioning signals at UE 150, wireless transceiver 1050 measures the positioning signal of each station therein normally. Moreover, in this example, in occasion I−1, while subframe 4 is being received at UE 150, wireless transceiver 1050 measures each station's positioning signal normally, and in operation 170 processor 1010 integrates the initial positioning measurements in the subframe 4 with initial positioning measurements in the previous subframe, i.e. subframe 3. Furthermore, at any time after occasion I−1 occurs in the timing schedule of positioning signals being received at UE 150, processor 1010 may identify strong positioning signals in operation 170, for use in mitigation to be performed in operation 180. In the following description, assume one strong positioning signal is marked for mitigation in operation 170. At this stage, processor 1010 may perform act 172 (FIG. 1D) to estimate the TOA of the strong positioning signal (assume TOA of a weak positioning signal is not possible to estimate, due to its SNR being below noise threshold, e.g. Th2).

Subsequently, in the just-described illustrative example, in occasion I (FIG. 1C), while subframe 3 is being received at UE 150, wireless transceiver 1050 measures the strong positioning signal normally, and in a first iteration of act 182 and act 184 (FIG. 1D) processor 1010 reconstructs the strong positioning signal's tones and mitigates (e.g. cancels, reduces or alters) the estimated tones of the strong positioning signal from the sample buffer, and in this manner measures the weak positioning signal (and these results may be stored in storage device 1025, as modified positioning measurements of subframe 3). Then, in occasion I (FIG. 1C), while subframe 4 is being received at UE 150, wireless transceiver 1050 measures the strong positioning signal normally, and in a second iteration of act 182 and act 184 (FIG. 1D) processor 1010 reconstructs the tones of the strong positioning signal, and mitigates (e.g. cancels, reduces or alters) these reconstructed tones from the sample buffer, and in this manner again measures the weak positioning signal, and integrates these results (i.e. modified positioning measurements of subframe 4), with subframe 3's modified positioning measurements (previously stored in storage device 1025, during receipt of an earlier frame that contained subframes 3 and 4 of occasion I). After occasion I (FIG. 1C), in act 192 (FIG. 1D) processor 1010 estimates the TOA of the weak positioning signal (and may update TOA of strong positioning signal, if needed again). Then, act 194 (FIG. 1D) is performed to use the TOAs of strong and weak positioning signals to compute a position, as described above.

Figure 2:
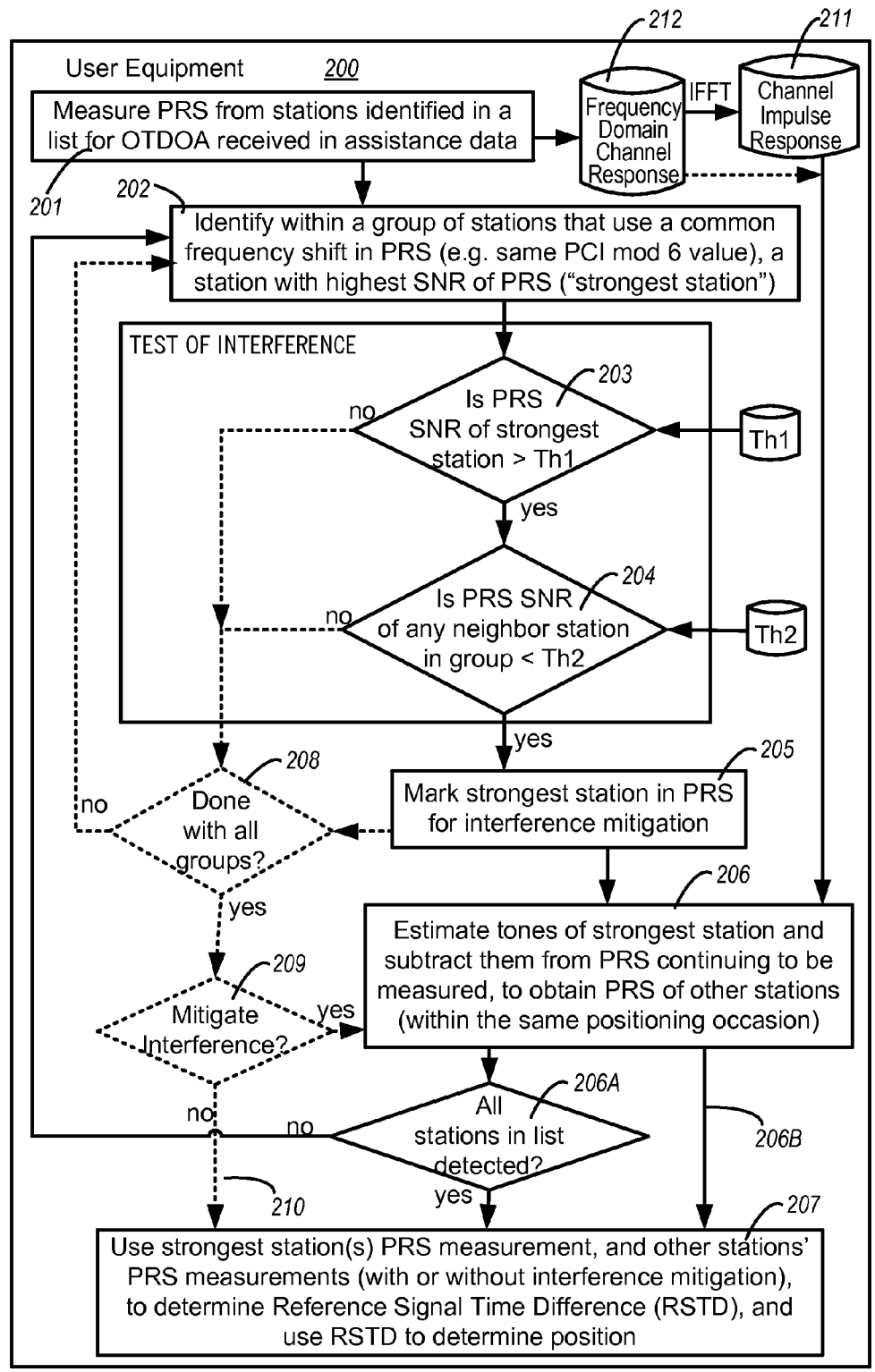
FIG. 2 illustrates, in a flow chart, some example acts that may be performed by user equipment in certain embodiments, to perform PRS measurements, initially without and subsequently with, mitigation (e.g., interference cancellation (IC)) of one or more positioning signals that are strong relative to other positioning signals received by the user equipment.

As illustrated in FIG. 2, in an act 201, several described embodiments of UE 200 of the type described above (e.g. UE 150) is designed to measure PRS signals from all base stations identified in the OTDOA cell list, in a normal manner. A normal manner of processing of PRS signals in UE 200 may be different in different implementations, based on the configuration of the PRS signal as specified in the 3GPP standard (which does not specify any implementation). Act 201 of some embodiments may include processing of PRS signals being measured to obtain PRS symbols (i.e. symbol processing), and/or may include obtaining tones at multiple frequencies (also called PRS tones). In certain embodiments of the type described herein, any existing normal flow of processing PRS signals in frequency domain (e.g. descrambling, combining repeated tones and de-staggering) may be modified, to store in a buffer 212 in non-transitory computer-readable memory an estimate of the frequency domain channel response and/or store in another buffer 211 an estimate of time-domain channel impulse response (CIR) of each base station, as generated from the received PRS signals.

Specifically, in some embodiments, channel impulse response in buffer 211 is obtained by an inverse fast fourier transform (IFFT) to the frequency domain channel response in buffer 212, which is measured during normal PRS processing in act 201 (FIG. 2). Depending on the embodiment, either frequency domain channel response stored in buffer 212 or time domain CIR stored in buffer 211 (FIG. 2) both in non-volatile memory, e.g. memory 1035 (FIG. 6) may be used as input subsequently, while continuing to measure PRS signals within a specific period, to simultaneously estimate and mitigate (e.g. cancel, reduce or alter) one or more tones of one or more strongest base stations in act 206 (FIG. 2) successively. One of the advantages of storing frequency-domain channel response in buffer 212 in act 201 is to save computational complexity in a frequency domain interference estimation method as shown in FIG. 5A (thereby to avoid using a FFT or DFT in act 413 in FIG. 4).

After processing of PRS signals in act 201, an act 202 is performed by UE 200 in embodiments of the type described herein, to identify a strongest base station in each frequency bin, based on normal processing of PRS signals in act 201. In some embodiments of act 202, a metric of signal-to-noise ratio (SNR) in the PRS signal may be computed by UE 200 for each base station, and base stations in a group (with a common PCID mod 6 value) may be ranked based on SNR to form a list, with the strongest base station being ranked first in the list. One example of an SNR metric that may be computed by UE 200 in certain described embodiments is based on channel energy response (CER), which in turn may be required for normal PRS processing, e.g. to detect earliest arrival path (EAP) of each base station. Channel energy response (CER) may be obtained by squaring the magnitude of the channel impulse response (CIR) 211. Another example of an SNR metric of the PRS signal that may be computed by UE 200 of some described embodiments is Reference Signal Received Power (RSRP), which in turn may be required for normal PRS processing in other implementations. Any other SNR metric may be used to identify the strongest base station in act 202, depending on the embodiment.

Thereafter, in acts 203 and 204, UE 200 may be designed (e.g. in hardware or software or a combination thereof) to check whether two conditions are satisfied, which may be checked in any order relative to one another, as follows. A first condition is whether the SNR metric of the PRS of the strongest base station ("strongest PRS signal") is greater than a first threshold, Th1. A second condition is whether the SNR metric of the PRS of any other base station in the frequency bin (with the same PCID mod 6 value as the strongest base station) is less than a second threshold Th2. When both conditions are met, specifically if within each group, the SNR metric of the PRS of the strongest base station (first in the list) is higher than the first threshold Th1 and there exists at least one other neighbor base station in that same group with SNR metric less than the second threshold Th2, then UE 200 may be designed to perform act 205. In act 205, the strongest base station within this group is marked in memory (e.g. see memory 1035 in FIG. 6) for mitigation of one or more tones of strong base station(s) (referred to herein as "interference"), followed by checking whether all groups (with different PCI mod 6 values) have been processed (see act 208 in FIG. 2, described below).

Values of thresholds Th1 and Th2 may be determined by experimentation, based on the specific method of processing PRS signals and interference mitigation chosen for implementation, and its range of reliable performance Guidelines to determine approximate values of thresholds Th1 and Th2 are described below, for some illustrative embodiments. Threshold Th2 depends on a detection threshold of the PRS signal in a normal flow of processing the PRS signal in act 201 (without interference mitigation), and a value of the SNR metric at which the UE declares detection of a base station. The detection threshold is predetermined, based on a tradeoff between desired detection rate of real base stations and false alarm rate of bogus base stations or unreal path of a real base station. Very high detection rates of real base stations and very low false alarm rates are both desired, but in order to achieve very low false alarm rates, the detection threshold needs to be set high, which in turn may lower detection rates. In practice, a detection rate of >90% and false alarm rate of <1% is pursued and the detection threshold is adjusted towards that.

Threshold Th2 may be set to be directly equal to detection threshold used in the normal flow of processing the PRS signal. If so, it effectively means that any base station not detected (below detection threshold) triggers one of the conditions shown in acts 203 and 204 in FIG. 2, thereby marking the strongest base station for PRS interference mitigation in act 205. In practice, it is possible to add an offset of a few dBs to the detection threshold, to obtain threshold Th2. If so, it means that even base stations above the detection threshold may trigger one of the conditions in FIG. 2. These base stations may already be detected in act 201 without PRS interference mitigation; however, reliability of measurement of the PRS signal may be increased when estimation and mitigation of a strong tone or multiple strong tones successively is done in act 206 (described below).

Threshold Th1 may be selected based on the value of threshold Th2 and average code isolation between scrambling codes of two base stations with different PCIDs. Based on a standard's description of the scrambling code, there may be 20 dB of average code isolation between two different base stations. Maximum isolation in some cases may be as much as 30 dB and minimum isolation can be as low as 17 dB. One interpretation of this isolation may be that in the presence of a strong base station, the noise floor is on average 20 dB below the SNR of the PRS of the strong base station (SNR of the "strong PRS signal") and may be determined by its interference, as opposed to background thermal noise. Hence, any other neighbor base station which is 20 dB weaker than the strong base station may remain undetected during normal processing of the PRS signal.

Typically, several described embodiments may set threshold Th1 as threshold Th2 plus an offset, where this offset depends on the reliability of the method chosen for PRS interference mitigation and also depend on the average (or minimum) code isolation. As an example, in a discovery phase in act 201 (FIG. 2), if only two base stations are found to be in the first frequency bin (corresponding to $v_{shift}=0$ (e.g. PCID0 and PCID6) and the SNR of the PRS of PCID0 and PCID6 are found to be 30 and 26 dB, respectively, after the discovery phase in act 201, there is no need to mark PCID0 for interference mitigation in act 205, because PCID6 is already well above the detection threshold. However, if SNR of the PRS of PCID6 is measured to be only 15 dB, then in an act 205, PCID0 is marked in memory, for interference mitigation.

Subsequently, in an act 206 that is performed in some embodiments in the same subframe as performance of act 201, UE 200 may be designed (e.g. in hardware or software or a combination thereof) to continue to measure the PRS signal in the subframe while simultaneously mitigating (e.g. cancelling, reducing or altering) one or more tones of strong PRS signal(s) estimated in the subframe (i.e. interference in other PRS signals by PRS signal(s) of one or more strong base station(s)), e.g. PCID0. Subsequently, in an act 206A, UE 200 checks if all stations in the list (see act 201) have been detected, and if so goes to act 207 and if not returns to act 202 (thereby to repeat the above-described acts 202-206, for another strongest station). Note that although estimation of strong PRS signal(s) and mitigation of the strong PRS signals while continuing to measure PRS signals has been described in this paragraph as occurring in a common subframe in some embodiments, other embodiments may be implemented using slower hardware wherein the estimation and mitigation are performed within two or more consecutive subframes (over a specific cyclical period) that occur in a common positioning occasion (also called PRS occasion) in a transmission schedule of period $T_{PRS}$.

When there are two strong interfering cells in a group, the strongest station is estimated and its effect is mitigated (e.g. cancelled, reduced or altered) first in a specific positioning occasion, and then a second strongest station is estimated and its effect is mitigated (e.g. cancelled, reduced or altered) next in the same specific positioning occasion, and so on until no more strongest stations are detected in which case the branch 206B is taken to act 207. Thereafter, in an act 207 (FIG. 2) performed by UE 200, the PRS measurement of the strongest base station, e.g. PCID0 (obtained in act 201) and the PRS measurement of one or more other base stations e.g. PCID6 (obtained in act 206 with mitigation or in act 201 without mitigation, depending on the conditions in acts 203 and 204) are used to determine the Reference Signal Time Difference (RSTD). The RSTD is thereafter used in a normal manner, to determine a position of the UE.

Acts 202-205 described above may be performed by UE 200 of some embodiments ("sequential embodiments") for a group of base stations sequentially, and repeated in a loop over multiple groups (e.g. 6 groups, wherein all base stations within a group have a common PCID mod 6 value), or alternatively the acts 202-205 may be performed by UE 200 in certain embodiments ("parallel embodiments") in parallel relative to these same acts 202-205 being simultaneously performed by UE 200 for other groups. In sequential embodiments, an act 208 may be performed by UE 200, after acts 203 and 204 are performed, to check if all groups have been processed and if not by UE 200 returning to act 202. Moreover, an act 209 may be performed (e.g. after act 208) in sequential embodiments, to check if any base station was marked for interference mitigation in memory, followed by act 206 in which interference of the marked base station is estimated (to obtain "interfering tones"), followed by re-measurement of the PRS signal with mitigation of the estimated interfering tones of the marked base station.

Figure 4:
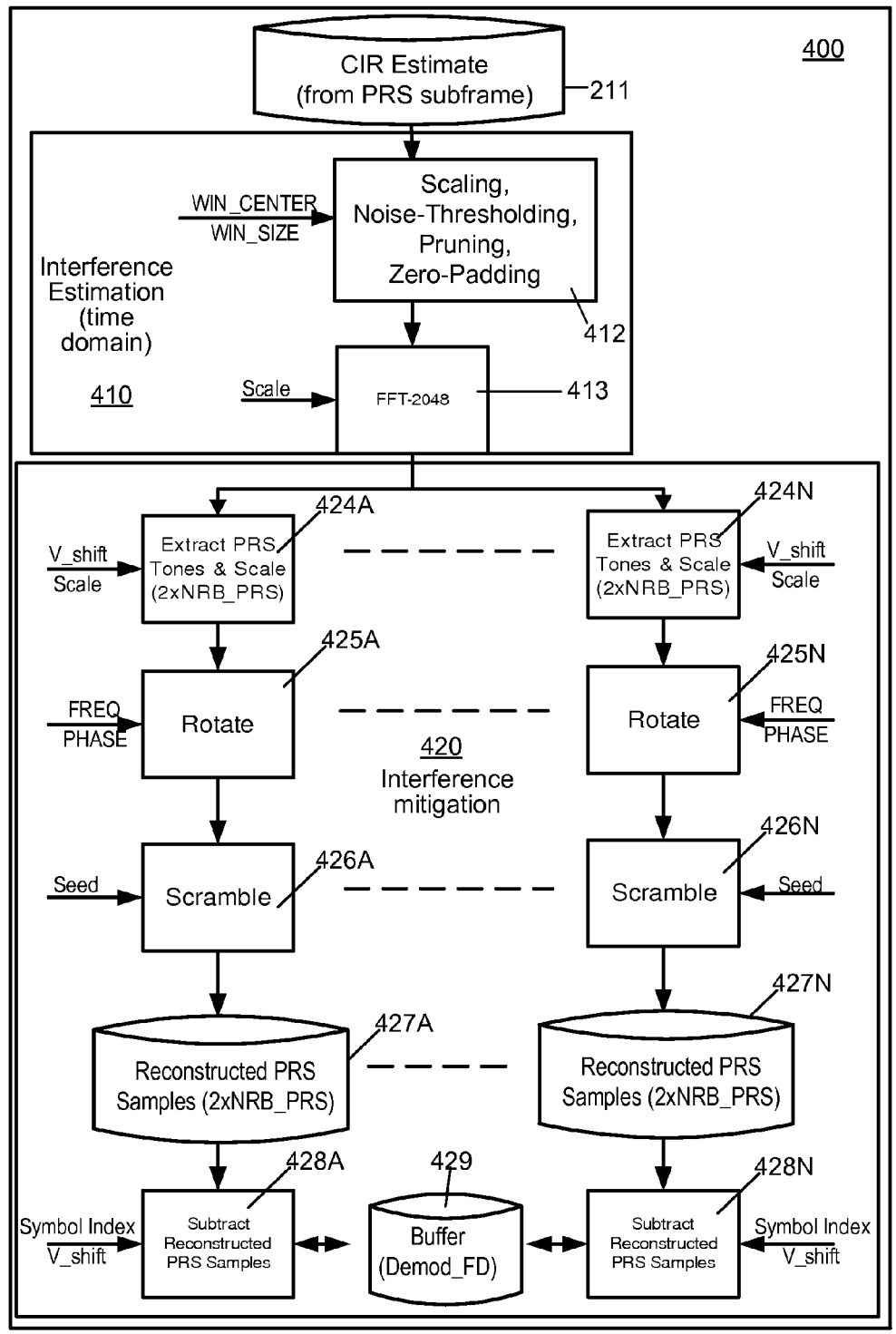
FIG. 4 illustrates, in a flow chart, some example acts that may be performed by user equipment 200 in certain embodiments, to estimate tones in a PRS signal of a strong cell, and mitigation of the tones in frequency domain, on a sub-frame basis.
Figure 5A:
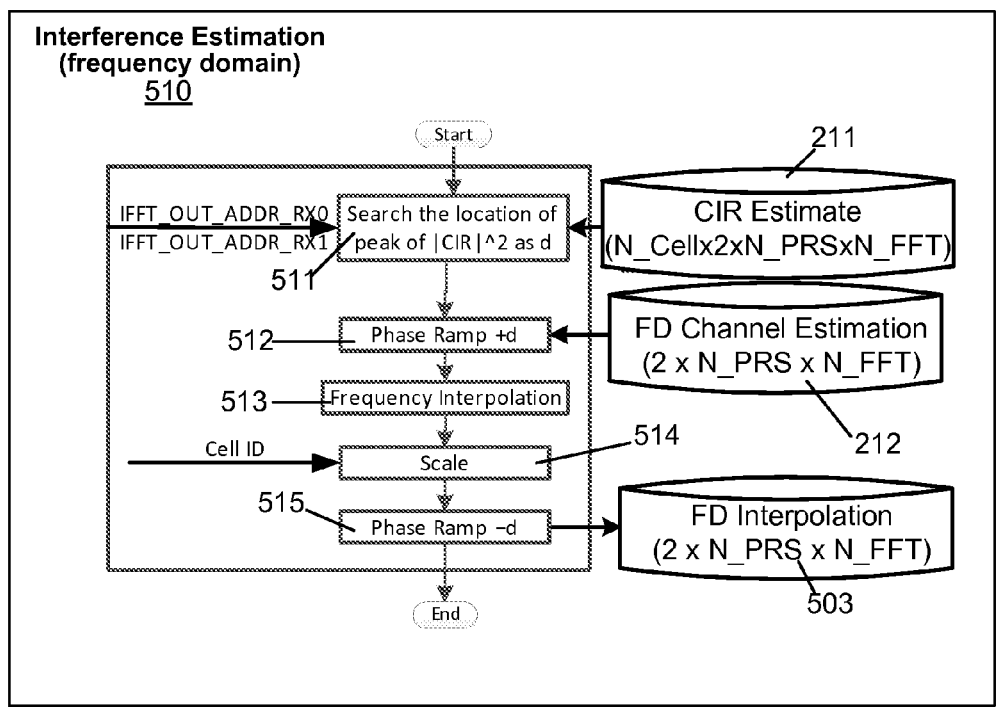
FIG. 5A illustrates, in a flow chart, some example acts that may be performed by user equipment 200 in certain embodiments, to estimate tones in a PRS signal from a strong cell in frequency domain.

Act 206 may be implemented by interference estimation in operation 410 and interference mitigation in operation 420 (FIG. 4) in some embodiments, while certain other embodiments may implement the act 206 by interference estimation in operation 510 (FIG. 5A) followed by interference mitigation in operation 420 (FIG. 4). The specific manner in which operation(s) 410, 420 and 510 are implemented may be different, depending on the embodiment. When no base station in any group is marked for interference mitigation in act 205 (e.g. when either of the conditions in act(s) 203 or 204 is not met), then as shown by branch 210, act 207 may be performed with the PRS measurements made in act 201.

In certain example implementation, it may be noted that PRS subframes may be sparse (unlike CRS). Specifically, the distance between PRS occasions is $T_{PRS}$ with minimum periodicity of 160 ms. Consequently, it is not possible to use any measurements of PRS (such as a CIR or CER vector) from a previous PRS occasion for interference mitigation in a present PRS occasion. Hence, channel estimation and interference mitigation in act 206 is not staggered relative to act 201, and instead in several embodiments, act(s) 201 and 206 are performed within the same subframe. The ultimate goal of user equipment, e.g. UE 200 is to be able to detect as many neighbor base stations as possible. As long as the EAP of a weak neighbor base station is accurately estimated by UE 200, the purpose is served. Interference mitigation of PRS in act 206 of some embodiments may improve the detection rate of weaker neighbor base stations that may be overpowered by stronger interfering base stations detected in act 201.

Figure 3:
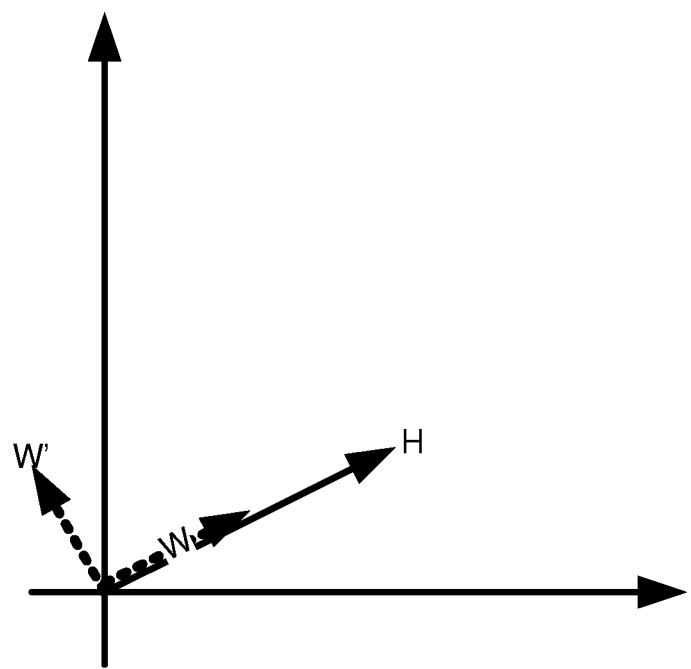
FIG. 3 illustrates, in a graph, an example method for mitigating interference from a strong cell in certain embodiments.

Act 206 may be implemented in different ways, depending on the embodiment. For example, some methods to mitigate interference from one or more strong base station(s) during processing of the PRS signal, may include: zero forcing (nulling) using more than one receive chains (as illustrated in FIG. 3), time-domain (TD) interference estimation and mitigation in frequency domain (FD) (as illustrated in FIG. 4), and frequency-domain (FD) interference estimation and mitigation (as illustrated in FIG. 5A). It should be understood that terms such as "mitigate", "mitigation", mitigating, or the like as used herein with regard to interference, are intended to represent one or more actions that affect all or part of one or more interfering aspects of one or more signals such that all or part of some potential for signal interference may be altered, reduced, or possibly even eliminated. Each of these three methods is described below, in reference to the corresponding figures.

In a method of zero forcing, Y is a vector of size N×1 denoting a set of PRS signals being transmitted from N distinct transmit antennas. In FIG. 3, a vector H denotes the M×N channel matrix modelling propagation effects from each of the N transmit antennas to any one of the M>1 receive antennas. The received signal R can be written as $$R=HY+N$$

where N is an additive noise vector. The receiver (e.g. UE 200) multiplies the received signal with a vector w which can achieve different means by design. A maximum ratio combining (MRC) can be achieved by setting=$H^H$. The zero-forcing receiver (e.g. at UE 200) is given by $$W=(H^H H)^{-1} H^H$$

In vector space analogy with two sensors, the effect of zero-forcing and its opposite (beamforming) is illustrated in FIG. 3. Choosing W enhances the source (beamforming) and choosing W' nulls the source out (interference nulling). In interference mitigation of the PRS signal, zero forcing requires at least two receive chains for mitigation of one strong interfering base station. In so doing, the gain of receive diversity may be exchanged for nulling the interference. In the case of two strong interfering users, 4 receive chains are needed by extension.

Another method used in some embodiments ("TD estimation embodiments") is interference estimation in the time domain, and interference mitigation in the frequency domain. Time domain interference estimation may be achieved in TD estimation embodiments by improving the quality of channel estimation in values of a vector in the time domain that represents the channel impulse response (CIR vector) 211. Quality of the CIR vector may be improved by scaling, noise-thresholding and pruning to obtain an improved CIR vector. PRS tones that are strongest (and hence interfering with weaker tones) may be obtained in some TD estimation embodiments taking a fast fourier transform (FFT) of the improved CIR vector, i.e. by going to the frequency domain. As will be readily apparent in view of this detailed description, instead of a fast fourier transform, a discrete fourier transform (DFT) may be used in other TD estimation embodiments. Mitigation of the strongest (i.e. interfering) tones may be accomplished in the frequency domain, in various TD estimation embodiments.

Interference mitigation of the PRS signal may be performed at a subframe level in some embodiments (as opposed to occasion-basis). Specifically, channel impulse response in buffer 211 (FIG. 2) may be processed in a method 400 of FIG. 4 that implements the act 206 of FIG. 2 in certain TD estimation embodiments, as follows. In method 400, UE 200 may be designed to perform an operation 410 of interference estimation in time domain, followed by an operation 420 of interference mitigation. Interference estimation in operation 410 may include act 412 of scaling, followed by pruning (also referred to as windowing), cleaning, and zero padding the time-domain CIR estimate in buffer 211 (saved by act 201 in FIG. 2 as a CIR vector), to improve quality of channel estimation in lower regions of SNR.

A scaling operation performed in act 412 (FIG. 4) may take the form of scaling each value in the CIR vector with its relative signal strength (RSS) over signal-plus-noise level, to obtain a scaled CIR vector. As such, the noisy values in the CIR vector are further attenuated in the scaling operation, without attenuating the values that have high relative signal strength, thereby improving the quality of the CIR vector.

A windowing (or pruning) operation also performed in act 412 is based on at least two inputs, namely WIN_CENTER and WIN_SIZE that are received as inputs. Window center (WIN_CENTER) is used to center the window of the scaled CIR to be included, while pruning the rest. The size of the window (WIN_SIZE) is the number of CIR elements on either side of WIN_CENTER that may be included while pruning the rest. One method to obtain the WIN_CENTER parameter is by finding the strongest peak in the CIR vector (e.g. CER=|CIR|^2, and identifying a maximum value therein). WIN_SIZE can be assigned to take the expected value of the channel delay spread, e.g. 4 micro-seconds as described in the second paragraph below. Alternatively, the WIN_CENTER can be obtained by translating the expected received signal time difference (RSTD) of the cell, which is furnished to UE by the network assistance data. WIN_SIZE can be obtained by translating the expected RSTD uncertainty, which is also furnished to UE by the network assistance data.

A cleaning operation also performed in act 412 (FIG. 4) includes noise-thresholding, which may take the form of comparing the energy of each value in the windowed CIR vector, with a predetermined threshold (supplied as input to the cleaning operation), and zeroing out a value (also called "tap") in the windowed CIR vector, if it does not exceed the predetermined threshold. The predetermined threshold may be determined in one embodiment as X dB below a maximum value of the CER vector, where X is predetermined to be either equal to, or slightly more, than a detection threshold of the PRS signal, in a normal flow of processing the PRS signal in act 201 (discussed above).

Further, the cleaning operation in act 412 of some embodiments includes zero-padding, which zeroes out all but regions where the majority of the energy (more than 50% of energy) of the CIR vector resides. Specifically, in such embodiments, all possible multipath profiles are expected not to exceed a predetermined value of delay spread (e.g., 4 μs), and therefore only the 4 micro-seconds of values around the strongest peak in the windowed CIR vector are retained and the rest are replaced by zeros (i.e. pruned), to obtain a pruned CIR vector. The delay spread can be heuristically assigned to be a certain fixed value, based on a conservative assumption of worst-case scenarios. It does not need to be exact. A conservative approximation works well.

A zero padding operation performed in some embodiments of act 412 (FIG. 4) is equivalent to adding zeros to either or both sides of the pruned CIR vector such that the output vector (input to the FFT stage in act 413, described next) is equivalent to FFT size. For instance, if the output length of the pruned vector is 128 and the FFT stage next is of size 2048, then 2048-128 or 1,920 zeros are inserted to obtain an improved CIR vector. Zero padding is done in act 412 for elements (or "taps") that are outside of the [WIN_CENTER-WIN_SIZE, WIN_CENTER+WIN_SIZE] range.

Thereafter, in act 413 (FIG. 4), the improved CIR vector resulting from act 412 is transformed to the frequency domain, by applying a 2048-point FFT. Depending on the embodiment, the size of FFT does not necessarily have to be 2048 and can be sufficiently large to cover the PRS signal bandwidth. Size 2048 is a size that covers all possible LTE bandwidth and is used in certain embodiments of act 413.

The FFT operation in act 413 (FIG. 4) may also take as input, a scale value which can be used in some embodiments, to additionally enhance the channel estimate quality, by adjusting for energy difference in the previous stage. The scale value is predetermined based on the number of taps that survive act 412, relative to size of FFT. Interference estimation in operation 410 (FIG. 4) with or without scaling of an improved CIR vector (output by act 412 in FIG. 4), provides an estimate of interference in the PRS signal. The improved CIR vector (with or without scaling) is transformed into the frequency domain in act 413, for use in interference mitigation in operation 420 (described below). Estimation of PRS signal interference, by generation of the improved CIR vector (with or without scaling), is believed to be novel and non-obvious.

Thereafter operation 420 of interference mitigation may be performed (based on the improved CIR vector), starting with acts 424A-424N (FIG. 4) for each of N tones in the frequency domain, to reconstruct original PRS tones, beginning on a symbol level basis. Specifically, this operation 420 may be repeated N times (performed once for each of the N tones), where N depends on the cyclic prefix (CP) type (which can be either Normal CP, abbreviated as NCP, or Extended CP abbreviated as ECP) and number of transmit (Tx) antennae (Ant) of the cell.

N=8 for NCP and 1-2 Tx Ant
N=7 for NCP and 4 Tx Ant
N=6 for ECP and 1-2 Tx Ant
N=5 for ECP and 4 Tx Ant For each of N repetitions, the corresponding PRS tones may be fetched in parallel in acts 424A-424N (FIG. 4) from one or more non-transitory computer-readable storage media that may store the output of an FFT operation in act 413 (described above). The just-described PRS tones are fetched based on an offset determined by a v_shift value (which is a first input), and scaled by a scaling coefficient (which is a second input) in acts 424A-424N, followed by rotation in acts 425A-425N in a direction opposite to the direction used in act 201 of FIG. 2 (specifically, measuring PRS followed by symbol processing), and scrambled in acts 426A-426N with a corresponding seed (same seed as used in act 201).

In particular, scaling operations in acts 424A-424N and rotation operations in acts 425A-425N are performed for estimating interference to undo any corresponding scaling and rotation operations that were performed in normal PRS measurement in act 201. Specifically, scaling operations in acts 424A-424N are the inverse of their counterparts in act 201. For example, in implementations wherein tones obtained from a PRS signal are scaled by a certain scaling factor during normal flow in act 201, the tones output by the FFT operation in act 413 are scaled in act(s) 424A by the inverse of that scaling factor (and this inverse is referred to in the paragraph above, as the second input). The scaling factor used in normal PRS measurement in act 201 of some embodiments adjusts for a gain over a datapath, to take advantage of a dynamic range of a fixed-point implementation of the datapath.

Additionally in act 201, certain embodiments may null out, attenuate or amplify some PRS symbols, depending on their collision with other channels, such as Primary Synchronization Signal (PSS) and Secondary Synchronization Signal (SSS). Thus, in these certain embodiments, such acts are performed in reverse, in the scaling operations of acts 424A-424N.

The purpose of a rotation operation in normal PRS measurement in act 201 is to account for timing shifts (e.g. due to drifts or adjustments that may be made by any time-tracking-technique implemented in user equipment, e.g. UE 200). Rotation or phase-ramping in the frequency domain in acts 425A-425N (for use in interference mitigation of PRS) is equivalent to a shift in time domain (also called timing shift). The values of time delays (or shifts) used in 425A-425N are specific to PRS samples (which at most can happen once every 160 subframe). In such embodiments, acts 425A-425N receive frequency and phase as inputs (to the rotation operation). Translation of a time shift to frequency/phase rotation can be performed in any normal manner, readily apparent to a skilled artisan based on common engineering techniques and formulae found in any signal processing textbook.

As noted above, results of acts 425A-425N are descrambled in acts 426A-426N with a seed which is input thereto (same seed as used in act 201). Descrambling in acts 426A-426N yields as corresponding outputs thereof, N reconstructed PRS tones for each of N symbols and the N reconstructed PRS tones (identifying a strongest cell) are stored in one or more non-volatile computer-readable storage media, such as media 427A-427N. The N reconstructed PRS tones (from the strongest cell) are subtracted in acts 428A-428N from one or more symbols in buffer 429 (which may contain tones that are currently being measured in the PRS signal, as per act 201), to obtain and store in memory 1035, an interference mitigated PRS signal (e.g. at the end of act 206 in FIG. 2).

In some embodiments, front end frequency domain symbol(s) in buffer 429 described above may be same as in buffer 212 that stores frequency domain channel response of act 201 (FIG. 2). Alternatively, certain embodiments maintain a duplicate of this buffer, and perform interference mitigation (in acts 428A-428N) on the duplicated buffer, e.g. buffer 429, without changing the values in a buffer 212 that stores frequency domain channel response (as per act 201 in FIG. 2). In illustrative embodiments, buffer 212 stores N front end frequency domain symbols, where N=8 for NCP and 1-and-2 Tx Ant, N=7 for NCP and 4 Tx Ant, N=6 for ECP and 1- and-2 Tx Ant, and N=5 for ECP and 4 Tx Ant. Thus, each symbol in buffer 212 has 2*N_RB PRS tones. In the illustrative embodiments, the duplicated buffer, e.g. buffer 429 stores only 1 symbol (i.e. one symbol) for the frequency domain channel response, which is a combined output of the descrambled N symbols stored in buffer 212. As noted above, the interference mitigated PRS signal output by acts 428A-428N includes tones from cells whose PRS signals are weakly sensed in UE 200, i.e. weaker than the strongest PRS signal (from the strongest cell), in any of one or more groups.

Thereafter, the interference mitigated PRS signal output by acts 428A-428N (e.g. in buffer 429) may be processed in a normal manner of processing the PRS signal, to detect tones of one or more weak cells. For example, the interference mitigated PRS signal may be scaled using a scaling factor that is used in normal PRS measurement in act 201 of some embodiments, to adjust for a gain over a datapath. Additionally, as noted above in reference to act 201, certain embodiments may null out, attenuate or amplify some PRS symbols, depending on their collision with other channels, such as Primary Synchronization Signal (PSS) and Secondary Synchronization Signal (SSS). Also, as noted above, a rotation operation of the type performed on normal PRS measurement in act 201 may be performed on the interference mitigated PRS signal, e.g. to account for timing shifts, as normally made in user equipment, e.g. UE 200.

As noted above, one or more of operation(s) 410 and 420 of some embodiments may be performed in real time in an act 206 (FIG. 2), e.g. within a common subframe in a radio frame of an LTE signal or within a duration of two or more consecutive subframes that occur in a common PRS occasion of period $T_{PRS}$, while certain other embodiments may implement an operation 410 and/or an operation 420 (and therefore act 206 of FIG. 2) in an offline manner based on values that are stored in real time in buffer 212 and buffer 429, e.g. stored during the common PRS occasion.

After the above-described operation 420 has completed, if a PRS occasion in which the operation 410 was started has not yet ended, the above-described operation(s) 410 and 420 may be repeated once more in real time, within the same cyclical period (e.g. same PRS occasion) as follows. Such a repetition may use the interference mitigated PRS signal in buffer 429 (see bottom of FIG. 4), as input to interference estimation by replacing the CIR vector in buffer 211 (see the top of FIG. 4), so that the real time repetition stores in media 427A-427N, a PRS signal of a strong cell that may be weaker than the strongest cell although stronger than other weak cells whose PRS signals are now stored in buffer 429, at the end of a first repetition during a common PRS occasion. The just-described real time repetition may be performed multiple times (by repeating the above-described acts in FIG. 4) within the same cyclical period (e.g. PRS occasion), to identify PRS signals of multiple cells that are weaker than the strongest cell.

Acts 424A-428A . . . 424N-428N of some embodiments are mirror images of corresponding operations done in normal PRS processing, and may be similar or identical to acts performed to implement interference mitigation for CRS signals although as noted above, measurements of PRS from a previous PRS occasion are not used in interference mitigation in a present (also called current) PRS occasion. Instead, interference mitigation for identification of weak PRS signals of some embodiments uses measurements made during the same (or current) PRS occasion. A PRS occasion provides at least 160 ms to complete operation(s) 410 and 420, which duration is sufficient for interference estimation and mitigation as described herein, based on the speed of processors that are currently available.

In certain embodiments ("FD estimation embodiments"), interference estimation of operation 410 (FIG. 4) in the time domain may be replaced by a corresponding operation 510 (FIG. 5A) performed in the frequency domain, as described below. In FD estimation embodiments, channel impulse response in buffer 211 in the time domain which is stored in memory by act 201 (FIG. 2) is used in act 511. Moreover, the frequency domain channel response in buffer 212 in the frequency domain which is stored in memory by act 201 (FIG. 2) is used in act 512-515 (FIG. 5A) as follows. Interference estimation in frequency domain in operation 510 includes peak detection in act 511, phase ramp operation in act 512 (circular shift to align peak to origin), interpolation of frequency domain channel response in act 513, scaling in act 514, reverse phase ramp operation in act 515 (to circular shift interpolated CIR back to original time axis), resulting in an interpolated FD channel response in buffer 503 (FIG. 5A). Interpolated FD channel response in buffer 503 which is output by operation 510 (FIG. 5A), is further processed in the frequency domain by interference mitigation in operation 420 (FIG. 4). Each of the above-described act(s) 511-515 is described below.

Peak detection in act 511 may be performed in some embodiments, as follows. Denote the estimated channel impulse response in buffer 211 which is stored by act 201 (FIG. 2) as the CIR vector in the time-domain namely CIR[n]. An estimation of channel energy response (CER) is obtained in act 511 by squaring in time domain, as follows: $CER[n] = |CIR[n]|^2$. Then, a position of a peak in the CER vector may be detected, by searching in act 511 for a maximum value among all values stored in the time-domain CER vector, as follows:

$$d = \max_n CER[n]$$

Phase ramp operation in act 512 may be performed in certain embodiments, as follows. A designed interpolation filter may be approximately equivalent to a time-domain window, centered at the origin. Thus, the purpose of act 512 is to circularly shift the estimated CIR to align the peak (detected in act 511) to origin. The shifted CIR is denoted by $$x[n] = CIR[(n+d) \bmod N_{FFT}]$$

Denote the frequency domain channel estimation as C[k] which is the FFT of CIR[n]. Moreover, we denote the FFT of x[n] as X[k]. Then the above circular shift in the time-domain is equivalent to a phase ramp (+d) in the frequency domain as follows $$X[k] = C[k] e^{j2\pi \frac{d}{N_{FFT}} k}$$

After frequency interpolation of X[k] in act 513 (discussed below), the output of the frequency domain channel interpolation is denoted by Ỹ[k]. A reverse operation is performed in act 515 which is equivalent to shifting the interpolated channel response back to the original time axis as CIR[n]. The reverse circular shift is equivalent to a phase ramp (−d) as follows:

$$\tilde{C}[k] = \tilde{Y}[k] e^{-j2\pi \frac{d}{N_{FFT}} k}$$

The above C̃[k] is stored in a memory and is utilized as follows. C̃[k] is the output from the FD interference estimation in operation 510, which will be the input to the interference mitigation in operation 420 in FIG. 4 (described above). Specifically, the same interference mitigation in operation 420 is used after finishing the FD interference estimation in operation 510 (to estimate PRS interference tones in frequency domain).

Interpolation of the FD channel response in act 513 may be performed as follows. Frequency interpolation is performed in some embodiments to eliminate aliasing. Specifically, the estimated frequency-domain channel response has zero magnitude at the frequency tones k, where k=6i+mod(2+v_shift, 6) 0≤i<2$N_{RB}$ for Normal CP and 1-2 Tx Ant k=3i+mod(2+v_shift, 3), 0≤i<4$N_{RB}$ for Normal CP and 4 Tx Ant k=3i+mod(2+v_shift, 3), 0≤i<4$N_{RB}$ for Extended CP and 1-2 Tx Ant k=3i+mod(2+v_shift, 3), 0≤i<4$N_{RB}$ and k=6i+mod(4+v_shift, 6), 0≤i<2$N_{RB}$ for Extended CP and 4 Tx Ant where v_shift=mod(PCID, 6), and $N_{RB}$ is the number of resource blocks (RBs). These zero tones in frequency domain cause aliasing in the time domain. In some embodiments, one out of every six frequency tones is a zero tone for Normal CP and 1-2 Tx Ant. Its time interval between two adjacent aliasing pulses is 2048×Ts/6=11.11 μs, where Ts=1/(15000× 2048) second. For Normal CP, 4 Tx Ant and Extended CP, 1-2 Tx Ant, one out of every three frequency tones is a zero tone. So their time intervals between two adjacent aliasing pulses is 2048×Ts/3=22.22 μs. For Extended CP and 4 Tx Ant, three out of six frequency tones are zero tones. Due to its repeat pattern, the time intervals between two adjacent aliasing pulses is 11.11 μs.

Figure 5B:
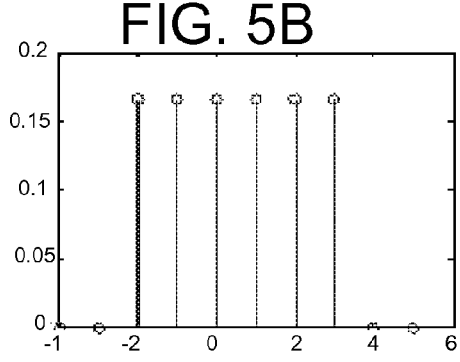
FIGS. 5B and 5C illustrate a frequency-domain interpolation filter and its time-domain magnitude response respectively, in accordance with certain example embodiments.
Figure 5C:
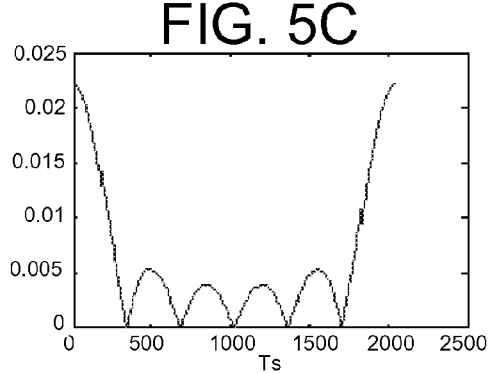

To eliminate aliasing pulses with the time interval of, for example 11.11 μs, one possible frequency interpolation filter is a 6-tap filter as follows $$H_6[k] = \frac{1}{6} \times [1\ 1\ 1\ 1\ 1\ 1]$$

which calculates the average value over the near-by six tones. The frequency-domain interpolation filter and its time-domain magnitude response are shown in FIGS. 5B and 5C respectively. As shown in FIG. 5C, the time-domain response attenuates the 11.11 μs aliasing pulses. Other possible frequency interpolation filters are the convolution of $H_6$ and itself, e.g. $H_6 \otimes H_6$ yields a 11-tap triangular interpolation filter. Similarly, to eliminate 22.22 μs aliasing pulses, one possible frequency interpolation filter is a 3-tap filter as follows.

$$H_3[k] = \frac{1}{3} \times [1\ 1\ 1]$$

Figure 5D:
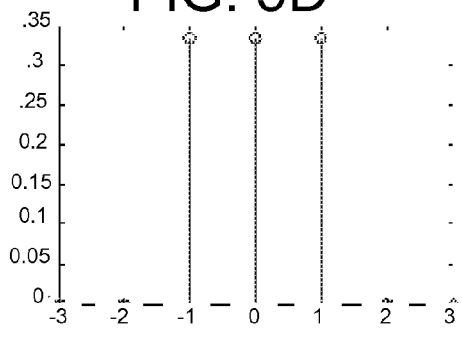
FIGS. 5D and 5E illustrate a 3-tap interpolation filter and its time-domain response respectively, in accordance with certain example embodiments.
Figure 5E:
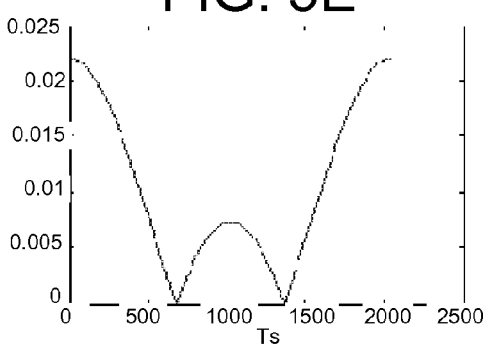

FIGS. 5D and 5E illustrate a 3-tap interpolation filter and its time-domain response respectively. Also, other possible frequency interpolation filter is a convolution of $H_3$. The number of taps of the frequency interpolation filter is summarized in Table 1 below, for different PRS configurations.

TABLE 1

The length of frequency interpolation filter, k ≥ 0

| Cyclic Prefix | PBCH antenna ports | |
| --- | --- | --- |
| | One or two | Four |
| Normal CP | 6 + 5 k | 3 + 2 k |
| Extended CP | 3 + 2 k | 6 + 5 k |

TABLE 2

The common scaling coefficient α for frequency interpolation

| Cyclic Prefix | PBCH antenna ports | |
| --- | --- | --- |
| | One or two | Four |
| Normal CP | 1.2 | 1.5 |
| Extended CP | 1.5 | 2 |

Figure 5F:
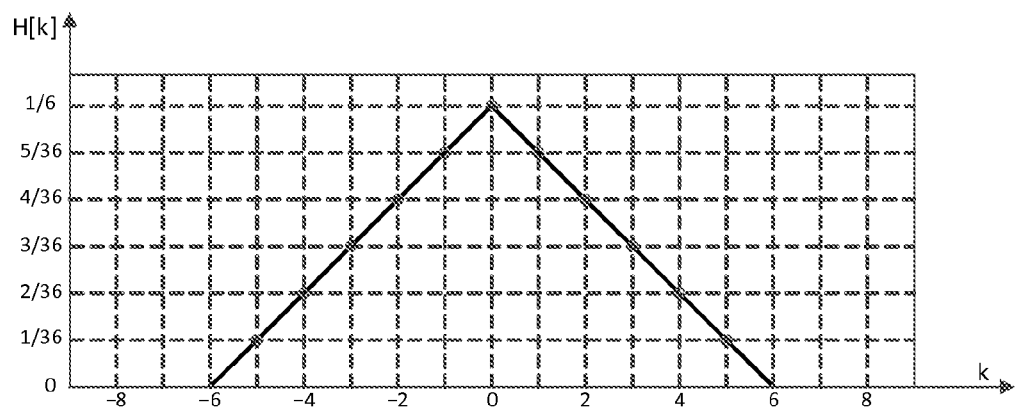
FIG. 5F illustrates a 11-tap interpolation filter, in accordance with certain example embodiments.

As an example, for normal CP and 1-2 Tx Ant, UE 200 may use a 11-tap interpolation filter which is presented as follows and is illustrated in FIG. 5F.

$$H[k] = \frac{1}{6} \times \begin{cases} 1 - \frac{k}{6} & 0 \le k \le 5 \\ 1 + \frac{k}{6} & -5 \le k \le -1 \\ 0 & \text{otherwise} \end{cases}$$

Note that the integral of the interpolation filter $\Sigma_{k=-5}^{5} H[k]=1$. The frequency domain channel interpolation Y[k] is the linear discrete convolution between X[k] and H[k], for $0 \le k \le N_{FFT}-1$ $$Y[k]=(X*H)[k]=\Sigma_{m=max\{0,k-5\}}^{min\{N_{FFT}-1,k+5\}} X[m]H[k-m]$$

Due to guard carriers around X[k], the above linear discrete convolution is the same as a circular discrete convolution between X[k] and H[k]. Note that the PRS bandwidth can be as large as $N_{RB}=100$ for 20 MHz; while the maximum LTE downlink system bandwidth is $N_{RB}=110$. There are 5 guard frequency tones on the lower-end of frequency band and 5 guard frequency tones on the upper-end of frequency band. Therefore, the operation shown above is equivalent to a multiplication between x [n] and h[n] in the time domain, where h[n] is the IFFT of H[k] with the length of $N_{FFT}$.

Figure 5G:
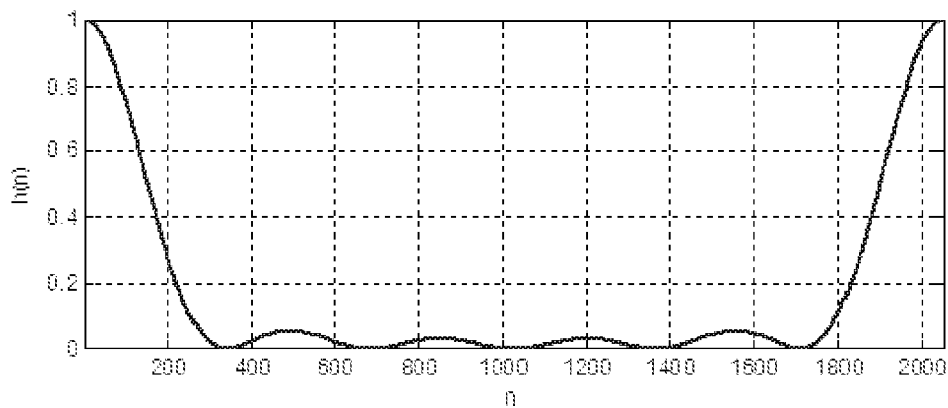
FIG. 5G shows a time-domain response of the interpolation filter in FIG. 5F, in accordance with certain example embodiments.

FIG. 5G shows the time-domain response of the interpolation filter h[n], of which the IFFT of H[k] is scaled with $N_{FFT}$ to make h[0]=1. As shown in FIG. 5G, the peak of h[n] is centered at n=0. Thus, the phase ramp (+d) in act 512 (FIG. 5A) circularly shifts the peak of CIR to n=0 aligning with the designed h [n]. The phase ramp (−d) in act 515 (FIG. 5A) reverses the circular shift of act 512 and moves the filtered CIR back to its original axis.

In some embodiments, scaling in act 514 may be performed as follows. Some of frequency tones do not have PRS pilots. Therefore, the frequency-domain convolution described above diminishes the energy of CIR, due to the inserted zero tones in the frequency domain. To overcome the energy diminishment, several embodiments of UE 200 multiply a boosting scalar α to Y[k]. The scalar α depends on the number of non-zero PRS tones in the frequency domain. Denote there are $K_{NZ}$ non-zero PRS tones out of 12 frequency tones in a resource block. Then the frequency interpolation needs to be multiplied with a scalar $\alpha=12/K_{NZ}$ to overcome the energy diminishment caused by zero tones. For example, the normal CP with one or two PBCH antenna ports has 10 non-zero PRS tones out of 12 frequency tones within a resource block, which implies α=1.2. Table 2 below shows a common scaling coefficient α for different CP and different numbers of PBCH antenna ports.

Even with the above boosting scalar α, the energy of band edge tones and the frequency tones around DC are still diminished due to the frequency interpolation. Therefore, a finer scaling operation is desired around the band edge tones and the frequency tones near DC. The scaling coefficients are cell-specific and vary over the frequency tones. Denote the frequency interpolation filter is H[k] for $k_1 \le k \le k_2$. For example, the 11-tap interpolation filter in FIG. 5F has $k_1=-5$ and $k_2=5$. The designed interpolation filter has the condition that its sum over all taps equals 1.

$$\sum_{k=k_1}^{k_2} H[k] = 1$$

The procedure of frequency interpolation is a convolution between the frequency-domain channel response X[m] and the interpolation filter H[m], for the frequency tones m within the PRS bandwidth, as follows:

$$Y[m] = (X*H)[m] = \sum_{k=k_1}^{k_2} X[m-k]H[k]$$

Note that some frequency tones of X[m] are zero. Hence, to maintain the energy level from X[m] to the interpolated Y[m], a scalar coefficient α[m] is calculated as follows $$\alpha[m] = 1 \Bigg/ \left( \sum_{\substack{k=k_1 \\ X[m-k] \ne 0}}^{k_2} H[k] \right)$$

Therefore, the final output of the frequency interpolation is α[m]Y[m].

Figure 5H:
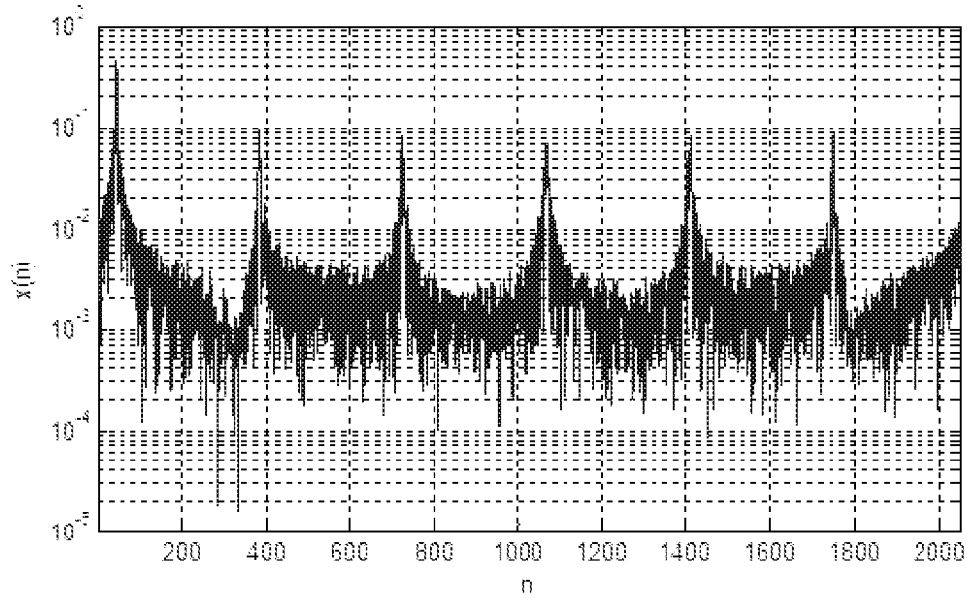
FIGS. 5H and 5I show an example of comparison between the channel impulse response (FIG. 5H) and the resulting CIR after frequency interpolation (FIG. 5I), in accordance with certain example embodiments.
Figure 5I:
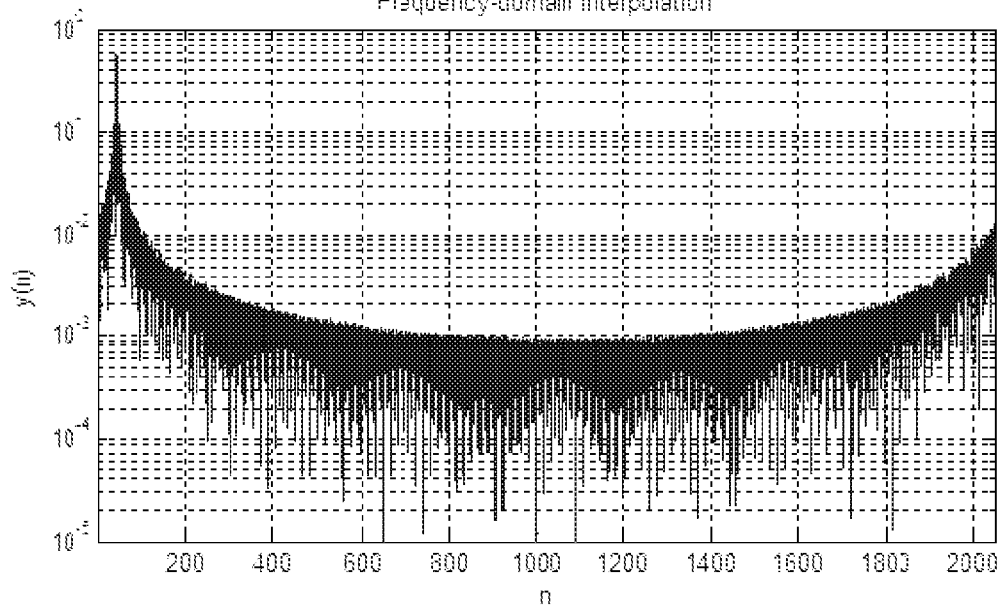

FIGS. 5H and 5I show an example of comparison between the channel impulse response (FIG. 5H) and the resulting CIR after frequency interpolation (FIG. 5I). As shown in FIGS. 5H and 5I, the aliasing terms are diminished by the frequency interpolation.

In several embodiments of the type described above, a frequency-domain interpolation filter is designed based on resource elements allocation pattern of a positioning signal, as shown in FIG. 5F. Specifically, one reason why a 11-tap triangular filter is used in such embodiments is due to a frequency re-use factor of 6 for a PRS signal (in conformance with LTE), in the frequency domain. Moreover, in some embodiments use a cell-specific gold code, to recreate interfering signals in acts 426A-426N (FIG. 4), for example as described in 3rd Generation Partnership Project (3GPP), standard 36.211 Section 6.10.4.1. Hence, certain embodiments simply reverse a normal process of PRS symbol and subframe processing in conformance with LTE (which is normally performed on initial positioning measurements), to regenerate interfering signals. To re-state, interference estimation in such embodiments is simply a reverse procedure, of normal PRS processing in conformance with LTE. Also, several embodiments of the type described herein use initial positioning measurements, of positioning signals, to measure channel energy response (CER), and use SNR of the CER to identify a specific positioning signal as interfering in an identification operation to determine whether to perform interference estimation and mitigation (or to not perform it), e.g. as illustrated in FIG. 2 (see acts 203, and 204 on how to identify a strong interfering positioning signal, using SNRs).

Moreover, although a test of interference, which is based on threshold-checking SNRs of multiple stations, is applied to initial positioning measurements which are measured in one or more earlier cyclical period(s) in certain embodiments, in alternative embodiments the just-described SNR-based test of interference may be applied to initial positioning measurements of positioning signals which are measured in the current cyclical period (e.g. in first and second subframes of a positioning occasion), followed by use of identification of an interfering station in interference estimation and mitigation as described above (e.g. in third and fourth subframes of the same positioning occasion, assuming $N_{PRS} \geq 4$). In such embodiments, interference identification, interference estimation and mitigation, may be performed all within a single cyclical period (e.g. of duration $N_{PRS}$) in which positioning signals are received.

Figure 6:
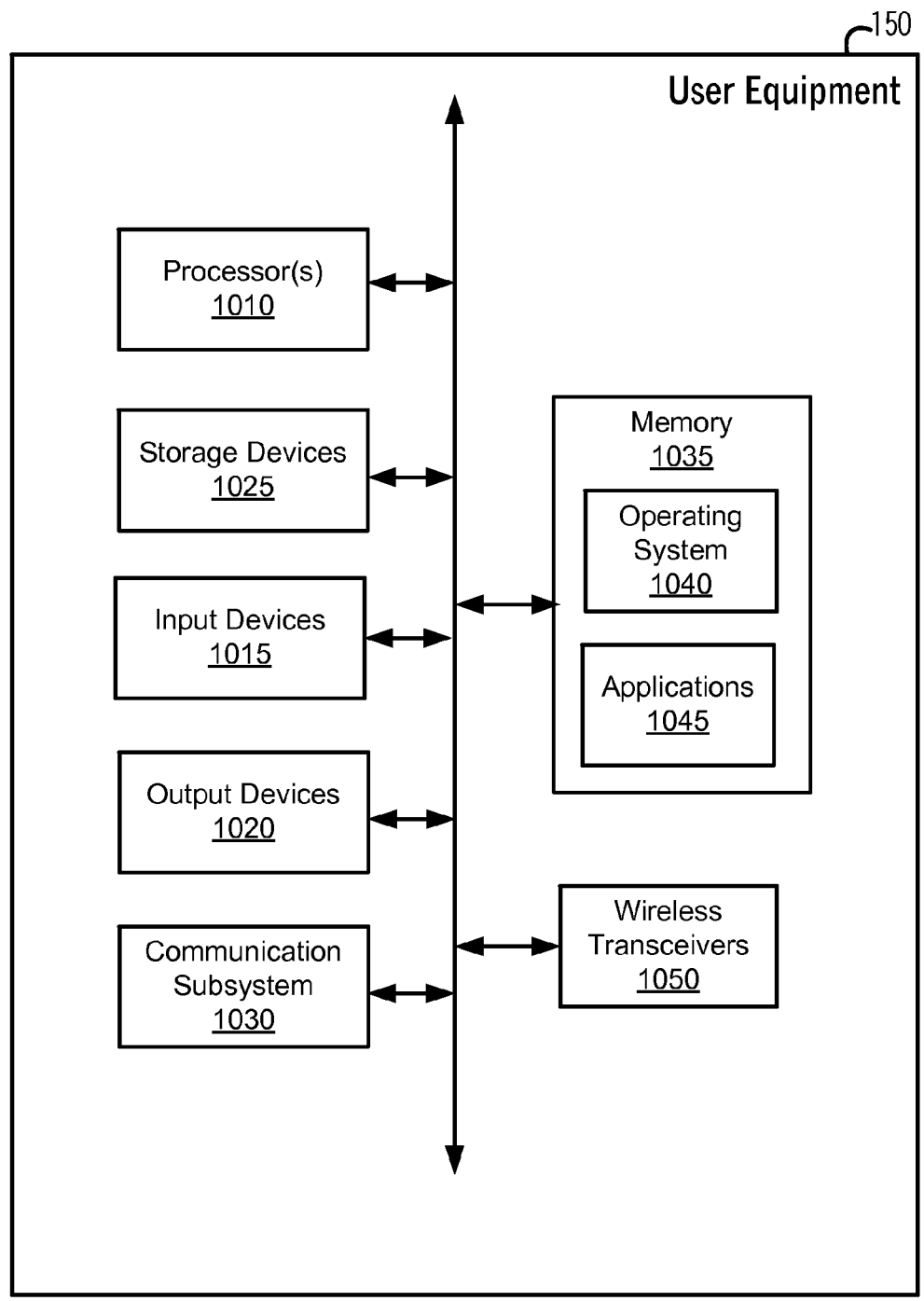
FIG. 6 illustrates an example of user equipment that can be used for mitigation of tones in a positioning signal, in accordance with certain example embodiments.

An example of user equipment (UE) in which various aspects of the disclosure may be implemented will now be described in reference to a computer system illustrated in FIG. 6. According to one or more aspects, a computer system as illustrated in FIG. 6 may be incorporated as part of an electronic device, which may implement, perform, and/or execute any and/or all of the features, methods, and/or method steps described herein. For example, computer system 1000 may represent some of the components of a hand-held device, such as UE 150 of FIG. 1A or UE 200 of FIG. 2. A hand-held device may be any computing device with an input sensory unit, such as a wireless receiver or modem. Examples of a hand-held device include but are not limited to video game consoles, tablets, smart phones, televisions, and mobile devices or mobile stations. In some embodiments, the computer system 1000 is configured to implement any of the methods described above.

FIG. 6 provides a schematic illustration of one embodiment of user equipment in the form of a computer system 1000 that can perform the methods provided by various other embodiments, as described herein, and/or can function as the host computer system, a remote kiosk/terminal, a point-of-sale device, a mobile device, a set-top box, and/or a computer system. FIG. 6 is meant only to provide a generalized illustration of various components, any and/or all of which may be utilized as appropriate. FIG. 6, therefore, broadly illustrates how individual system elements may be implemented in a relatively separated or relatively more integrated manner in a UE.

The computer system 1000 is shown comprising hardware elements that can be electrically coupled via a bus 1005 (or may otherwise be in communication, as appropriate). The hardware elements may include one or more processor(s) 1010, including without limitation one or more general-purpose processors and/or one or more special-purpose processors (such as digital signal processing chips, graphics acceleration processors, and/or the like); one or more input devices 1015, which can include without limitation a camera, wireless receivers, wireless sensors, a mouse, a keyboard and/or the like; and one or more output devices 1020, which can include without limitation a display unit, a printer and/or the like. In some embodiments, the one or more processor(s) 1010 may be configured to perform a subset or all of the functions described above with respect to FIG. 2. The processor(s) 1010 may comprise a general processor and/or and application processor, for example. In some embodiments, the processor is integrated into an element that processes visual tracking device inputs and wireless sensor inputs.

The computer system 1000 may further include (and/or be in communication with) one or more non-transitory storage devices, e.g. storage device 1025, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a non-transitory working memory, e.g. memory 1035, which can include a RAM or ROM device, as described above. In some embodiments, the communications subsystem 1030 may interface with wireless transceiver(s) 1050 configured to transmit and receive signals wirelessly from access points and/or mobile devices and/or base stations. Some embodiments may include a separate receiver or receivers, and a separate transmitter or transmitters.

The computer system 1000 also can comprise software elements, shown as being currently located within memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 2, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1000) to perform methods in accordance with the disclosure. For example, some or all of the procedures of the described methods may be performed by the computer system 1000 in response to processor(s) 1010 executing one or more sequences of one or more instructions (which might be incorporated into the operating system 1040 and/or other code, such as an application program(s) 1045) contained in memory 1035. Such instructions may be read into memory 1035 from another computer-readable medium, such as one or more of the storage device(s) 1025. Merely by way of example, execution of the sequences of instructions contained in memory 1035 might cause the processor(s) 1010 to perform one or more procedures of the methods described herein, for example methods described with respect to FIG. 6.

The terms "machine-readable medium" and "computer-readable medium," as used herein, refer to any non-transitory medium that participates in providing data that causes a machine to operate in a specific fashion. In an embodiment implemented using the computer system 1000, various non-transitory computer-readable media might be involved in providing instructions/code to processor(s) 1010 for execution and/or might be used to store and/or carry such instructions/code (e.g., as signals). Non-transitory computer-readable media include, for example, optical and/or magnetic disks, such as storage device(s) 1025. Non-transitory computer-readable media also include dynamic memory, such as memory 1035.

In many implementations, a non-transitory computer-readable medium is a physical and/or tangible storage medium. Common forms of physical and/or tangible media that are computer readable include, for example, a floppy disk, a flexible disk, hard disk, magnetic tape, or any other magnetic medium, a CD-ROM, any other optical medium, any other physical medium with patterns, a RAM, a PROM, EPROM, a FLASH-EPROM, any other memory chip or cartridge or any other non-transitory medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention. Transmission media include, without limitation, coaxial cables, copper wire and fiber optics, including the wires that comprise the bus 1005, as well as the various components of the communications subsystem 1030 (and/or the media by which the communications subsystem 1030 provides communication with other devices).

The communications subsystem 1030 (and/or components thereof) generally receive signals, and bus 1005 might carry the signals (and/or the data, instructions, etc. carried by the signals) to memory 1035, from which the processor(s) 1010 retrieves and executes the instructions. The instructions received by memory 1035 may optionally be stored on a non-transitory storage device(s) 1025 either before or after execution by the processor(s) 1010. Memory 1035 may contain at least one database according to any of the databases and methods described herein. Memory 1035 may thus store any of the values discussed in any of the present disclosures, including FIG. 2 and related descriptions, such as TDOA measurements, and thresholds Th1, Th2.

The methods described in FIGS. 1C and 2 may be implemented by various blocks in FIG. 6. For example, processor(s) 1010 may be configured by instructions and data to perform any of the functions of acts and operations in method 400 (FIG. 4). Storage device 1025 may be configured to store an intermediate result, such as frequency domain channel response and channel impulse response discussed within any of blocks mentioned herein. Storage device 1025 may also contain a database consistent with any of the present disclosures. The memory 1035 may similarly be configured to record signals, representation of signals, or database values necessary to perform any of the functions described in any of the blocks mentioned herein. Results that may need to be stored in a non-transitory memory, such as RAM, may also be included in memory 1035, and may include any intermediate result similar to what may be stored in storage device 1025, such as, frequency domain channel response and channel impulse response. Input device(s) 1015 may be configured to receive wireless signals from satellites and/or base stations according to the present disclosures described herein. Output device(s) 1020 may be configured to display images, print text, transmit signals and/or output other data according to any of the present disclosures.

In some embodiments, continuing to measure positioning signals in a particular cyclical period (e.g. one of the positioning occasions that occur repeatedly, at a periodicity defined by a period $T_{PRS}$), while simultaneously mitigating (e.g., reducing, canceling, etc.) one or more tones by a UE enables detection of one or more weak positioning signals that are otherwise undetectable. In certain embodiments, estimation and mitigation of strong positioning signals are performed within a single subframe I of the particular positioning occasion within a radio frame of period $T_{PRS}$ in the LTE signal, wherein $\Delta_{PRS} \leq I < \Delta_{PRS} + N_{PRS}$. Thus, multiple PRS signals from corresponding multiple base stations may be measured within the same Observed Time Difference of Arrival (OTDOA) session even when one or more strong cells interfere with one or more weak cells, and measurements from strong cell(s) and weak cell(s) may be used together, to determine Reference Signal Time Difference (RSTD), and the RSTD used to determine the UE's position.

In some embodiments, wireless transceiver(s) 1050 configured to transmit and receive signals wirelessly, may implement means for measuring a plurality of positioning signals that are synchronized relative to one another, to obtain initial positioning measurements. In several such embodiments, processor(s) 1010 configured to execute a first sequence of one or more instructions contained in memory 1035 implement means for applying a test of interference to the initial positioning measurements measured within a current cyclical period (e.g. a specific positioning occasion of $N_{PRS}$ subframes) in a transmission schedule of positioning signals (e.g.

in accordance with LTE), to identify one or more interfering station(s). Moreover, in several such embodiments, processor(s) 1010 configured to execute a second sequence of one or more instructions contained in memory 1035 implement means for estimating a first plurality of tones of one or more interfering station(s), based on the initial positioning measurements measured in the current cyclical period. In several such embodiments, processor(s) 1010 configured to execute a third sequence of one or more instructions contained in memory 1035 implement means for mitigating the first plurality of tones of one or more interfering station(s), from the initial positioning measurements in the current cyclical period, to obtain modified positioning measurements measured in the current cyclical period. Moreover, in some embodiments, processor(s) 1010 configured to execute a fourth sequence of one or more instructions contained in memory 1035 implement means for determining a first plurality of arrival times at the apparatus, based on initial positioning measurements of positioning signals (e.g. from one or more interfering station(s)). And, in some embodiments, processor(s) 1010 configured to execute a fifth sequence of one or more instructions contained in memory 1035 implement means for determining a second plurality of arrival times at the apparatus, based on modified positioning measurements of positioning signals (e.g. from one or more weak station(s)). Finally, in some embodiments, processor(s) 1010 configured to execute a sixth sequence of one or more instructions contained in memory 1035 to implement means for using the first plurality of arrival times and the second plurality of arrival times, to compute and store in one or more non-transitory computer readable storage media, the position of the apparatus.

Accordingly, several embodiments of the type described herein do not rely on coefficient correlation or TOA estimate to identify an interfering signal. Instead, as noted above, a test for interference in such embodiments uses signal-to-noise ratios (SNRs) based on initial positioning measurements. More specifically, some embodiments check whether the SNR of the strongest signal exceeds one threshold Th1 and whether the SNR of one or more weak signals falls below another threshold Th2, to determine whether or not to perform interference estimation and interference mitigation, on initial positioning measurements. As noted above, the initial positioning measurements over which interference estimation and mitigation are performed, are measured within a single cyclical period (e.g. within the duration of a single positioning occasion) in many embodiments to ensure that interference estimates do not become stale and unreliable, e.g. over a time lapse of 160 milliseconds (or any such duration of $T_{PRS}$ subframes). Thus, such embodiments do not estimate interference in a first positioning occasion, and subsequently mitigate interference in a second positioning occasion (because separation by a duration of $T_{PRS}$ subframes or more results in loss of accuracy, and unreliability).

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of various embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe certain acts as a sequential process, many of the acts can be performed in parallel or concurrently. In addition, the order of some acts may be rearranged, although interference estimation in act 182 must be performed before interference mitigation in act 184. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

The invention claimed is:

1. A method for use in determining a position of a user equipment, the method comprising:
  measuring, by a wireless transceiver in the user equipment, a plurality of positioning signals that are synchronized relative to one another, to obtain initial positioning measurements;
  estimating, by a processor in the user equipment, a first plurality of tones of one or more interfering station(s), based on the initial positioning measurements measured in a current cyclical period during which positioning signals are transmitted per a transmission schedule, and based on identification of the one or more interfering station(s);
  mitigating, by the processor in the user equipment, the first plurality of tones of one or more interfering station(s), from the initial positioning measurements measured in the current cyclical period, to obtain modified positioning measurements of the current cyclical period;
  determining, by the processor in the user equipment, a first plurality of arrival times at the user equipment, based at least on the initial positioning measurements;
  determining, by the processor in the user equipment, a second plurality of arrival times at the user equipment, based at least on the modified positioning measurements; and computing, by the processor in the user equipment, a position of the user equipment based, at least in part, on the first plurality of arrival times and the second plurality of arrival times.

2. The method of claim 1 wherein the current cyclical period has a duration of a predetermined number of subframes $N_{PRS}$ which are grouped into a positioning occasion, in the transmission schedule.

3. The method of claim 1 further comprising:
applying, by the processor in the user equipment, a test of interference to additional initial positioning measurements measured in one or more earlier cyclical periods, to identify the one or more interfering station(s) prior to the current cyclical period.

4. The method of claim 3 wherein the test of interference comprises:
determining whether a signal-to-noise ratio of a positioning signal from a strongest station is greater than a first threshold; and
determining whether another signal-to-noise ratio of another positioning signal from another station is less than a second threshold.

5. The method of claim 1 wherein:
the modified positioning measurements obtained in a first subframe within the current cyclical period are integrated with the modified positioning measurements obtained in a second subframe within the current cyclical period.

6. The method of claim 1 wherein mitigating of the first plurality of tones of one or more interfering station(s) comprises:
scaling tones of the one or more interfering station(s), opposite to a direction used in symbol processing to obtain a plurality of unscaled tones;
rotating the plurality of unscaled tones in a direction inverse of symbol processing to obtain a plurality of unrotated tones;
scrambling the plurality of unrotated tones with a predetermined seed to obtain a plurality of reconstructed tones; and
subtracting the plurality of reconstructed tones from positioning signals measured by the wireless transceiver, to obtain the modified positioning measurements.

7. The method of claim 1 wherein estimation of the first plurality of tones of one or more interfering station(s) comprises:
scaling each first tap of a vector of channel impulse response (CIR) of the initial positioning measurements, with relative signal strength over signal-plus-noise level, to obtain a windowed CIR vector;
comparing energy of each second tap of the windowed CIR vector with a predetermined noise threshold and zeroing out a specific second tap if the specific second tap does not exceed the predetermined noise threshold, to obtain a cleaned CIR vector;
setting to zero, a plurality of values in the cleaned CIR vector outside a window of a predetermined duration, the window being centered at a main peak in the cleaned CIR vector, to obtain a pruned CIR vector;
adding zero values to the pruned CIR vector that are sufficient in number, to obtain an improved CIR vector of a length determined by a predetermined fourier transform; and
applying the predetermined fourier transform to the improved CIR vector, to obtain and store in memory the first plurality of tones of one or more interfering station(s).

8. The method of claim 1 wherein estimation of the first plurality of tones of one or more interfering station(s) comprises:
searching for a peak in a vector of channel impulse response (CIR) of positioning signals;
aligning the peak to origin, by performing a circular shift using frequency domain channel response of positioning signals, to obtain an origin-centered CIR vector;
eliminating aliasing in the origin-centered CIR vector by frequency interpolation, to obtain an interpolated CIR vector;
scaling the interpolated CIR vector to overcome energy diminishment caused by zero tones, to obtain a scaled CIR vector; and
performing on the scaled CIR vector, reverse of the circular shift, to obtain and store in memory the first plurality of tones of one or more interfering station(s).

9. A non-transitory computer-readable storage media comprising a plurality of instructions that are executable by a processor in a user equipment to direct the user equipment to:
measure strengths of positioning signals that are synchronized relative to one another, to obtain initial positioning measurements;
estimate a first plurality of tones of one or more interfering station(s), based on the initial positioning measurements measured in a current cyclical period during which positioning signals are transmitted per a transmission schedule, and based on identification of the one or more interfering station(s);
mitigate the first plurality of tones of one or more interfering station(s to obtain modified positioning measurements of the current cyclical period;
determine a first plurality of arrival times at the user equipment, based at least on the initial positioning measurements;
determine a second plurality of arrival times at the user equipment, based at least on the modified positioning measurements; and
compute a position of the user equipment based, at least in part, on the first plurality of arrival times and the second plurality of arrival times.

10. The non-transitory computer-readable storage media of claim 9 wherein the current cyclical period has a duration of a predetermined number of subframes $N_{PRS}$ which are grouped into a positioning occasion, in the transmission schedule.

11. The non-transitory computer-readable storage media of claim 9, wherein the instructions are further executable by the processor to direct the user equipment to:
apply a test of interference to additional initial positioning measurements measured in one or more earlier cyclical periods, to identify the one or more interfering station(s) prior to the current cyclical period.

12. The non-transitory computer-readable storage media of claim 11 wherein the instructions are further executable by the processor to direct the user equipment, as part of the test of interference, to:
determine whether a signal-to-noise ratio of a positioning signal from a strongest station is greater than a first threshold; and
determine whether another signal-to-noise ratio of another positioning signal from another station is less than a second threshold.

13. The non-transitory computer-readable storage media of claim 9, wherein the instructions are further executable by the processor to direct the user equipment to: integrate the modified positioning measurements obtained in a first subframe within the current cyclical period with the modified positioning measurements obtained in a second subframe within the current cyclical period.

14. The non-transitory computer-readable storage media of claim 9 wherein the instructions are further executable by the processor to direct the user equipment to:
   scale, the first plurality of tones of one or more interfering station(s), opposite to a direction used in symbol processing to obtain a plurality of unscaled tones;
   rotate the plurality of unscaled tones in a direction inverse of symbol processing to obtain a plurality of unrotated tones;
   scramble the plurality of unrotated tones with a predetermined seed to obtain a plurality of reconstructed tones; and
   subtract the plurality of reconstructed tones from a plurality of tones output by execution of the instructions to measure positioning signals, to obtain the modified positioning measurements.

15. The non-transitory computer-readable storage media of claim 9, wherein the instructions are further executable by the processor to direct the user equipment to:
   scale each first tap of a vector of channel impulse response (CIR) of positioning signals, with relative signal strength over signal-plus-noise level, to obtain a windowed CIR vector;
   compare energy of each second tap of the windowed CIR vector with a predetermined noise threshold and zeroing out a specific second tap if the specific second tap does not exceed the predetermined noise threshold, to obtain a cleaned CIR vector;
   set to zero, a plurality of values in the cleaned CIR vector outside a window of a predetermined duration, the window being centered at a main peak in the cleaned CIR vector, to obtain a pruned CIR vector;
   add zero values to the pruned CIR vector that are sufficient in number, to obtain an improved CIR vector of a length determined by a predetermined fourier transform; and
   apply the predetermined fourier transform to the improved CIR vector, to obtain and store in memory the first plurality of tones of one or more interfering station(s).

16. The non-transitory computer-readable storage media of claim 9, wherein the instructions are further executable by the processor to direct the user equipment to:
   search for a peak in a vector of channel impulse response (CIR) of positioning signals;
   align the peak to origin by performing a circular shift using frequency domain channel response of positioning signals, to obtain an origin-centered CIR vector;
   eliminate aliasing in the origin-centered CIR vector by frequency interpolation, to obtain an interpolated CIR vector;
   scale the interpolated CIR vector to overcome energy diminishment caused by zero tones, to obtain a scaled CIR vector; and
   perform on the scaled CIR vector, reverse of the circular shift, to obtain and store in memory the first plurality of tones of one or more interfering station(s).

17. A device comprising:
   a wireless transceiver;
   a memory;
   a processor operatively coupled to the wireless transceiver and the memory, and wherein the processor and the memory are configured to:
   obtain initial positioning measurements from the wireless transceiver, the initial signal strength measurements corresponding to measured strengths of positioning signals that are synchronized relative to one another;
   estimate a first plurality of tones of one or more interfering station(s), based on the initial positioning measurements measured in a current cyclical period during which positioning signals are transmitted per a transmission schedule, and based on identification of the one or more interfering station(s);
   mitigate the first plurality of tones of one or more interfering station(s), from the initial positioning measurements measured in the current cyclical period, to obtain modified positioning measurements of the current cyclical period;
   determine a first plurality of arrival times at the device, based at least on the initial positioning measurements;
   determine a second plurality of arrival times at the device, based at least on the modified positioning measurements; and
   determine a position of the user device based, at least in part, on the first plurality of arrival times and the second plurality of arrival times.

18. The device of claim 17 wherein the current cyclical period has a duration of a predetermined number of subframes $N_{PRS}$ which are grouped into a positioning occasion, in the transmission schedule.

19. The device of claim 17 wherein the processor and the memory are further configured to:
   apply a test of interference to additional initial positioning measurements measured in one or more earlier cyclical periods, to identify the one or more interfering station(s) prior to the current cyclical period.

20. The device of claim 19 wherein, as part of the test of interference, the processor and the memory are further configured to:
   determine of whether a signal-to-noise ratio of a positioning signal from a strongest station is greater than a first threshold; and
   determine of whether another signal-to-noise ratio of another positioning signal from another station is less than a second threshold.

21. The device of claim 17 wherein to mitigate the first plurality of tones of one or more interfering station(s), the processor and the memory are further configured to:
   scale tones of the one or more interfering station(s), opposite to a direction used in symbol processing to obtain a plurality of unscaled tones;
   rotate the plurality of unscaled tones in a direction inverse of symbol processing to obtain a plurality of unrotated tones;
   scramble the plurality of unrotated tones with a predetermined seed to obtain a plurality of reconstructed tones; and
   subtract the plurality of reconstructed tones from positioning signals measured by the wireless transceiver, to obtain the modified positioning measurements.

22. The device of claim 17 wherein to estimate the first plurality of tones of one or more interfering station(s), the processor and the memory are further configured to:
   scale each first tap of a vector of channel impulse response (CIR) of the initial positioning measurements, with relative signal strength over signal-plus-noise level, to obtain a windowed CIR vector;
   compare energy of each second tap of the windowed CIR vector with a predetermined noise threshold and zeroing out a specific second tap if the specific second tap does not exceed the predetermined noise threshold, to obtain a cleaned CIR vector;

set to zero, a plurality of values in the cleaned CIR vector outside a window of a predetermined duration, the window being centered at a main peak in the cleaned CIR vector, to obtain a pruned CIR vector;

add zero values to the pruned CIR vector that are sufficient in number, to obtain an improved CIR vector of a length determined by a predetermined fourier transform; and apply the predetermined fourier transform to the improved CIR vector, to obtain and store the first plurality of tones of one or more interfering station(s).

23. The device of claim 17 wherein to estimate the first plurality of tones of one or more interfering station(s), the processor and the memory are further configured to:

search for a peak in a vector of channel impulse response (CIR) of positioning signals;

align the peak to origin, by performing a circular shift using frequency domain channel response of positioning signals, to obtain an origin-centered CIR vector;

eliminate aliasing in the origin-centered CIR vector by frequency interpolation, to obtain an interpolated CIR vector;

scale the interpolated CIR vector to overcome energy diminishment caused by zero tones, to obtain a scaled CIR vector; and perform on the scaled CIR vector, reverse of the circular shift, to obtain and store the first plurality of tones of one or more interfering station(s).

24. An apparatus for use in a user equipment to determine a position of the user equipment, the apparatus comprising:

means for measuring a plurality of positioning signals that are synchronized relative to one another, to obtain initial positioning measurements;

means for estimating a first plurality of tones of one or more interfering station(s), based on the initial positioning measurements measured in a current cyclical period during which positioning signals are transmitted in a transmission schedule, and based on identification of the one or more interfering station(s);

means for mitigating the first plurality of tones of one or more interfering station(s), from the initial positioning measurements in the current cyclical period, to obtain modified positioning measurements of the current cyclical period;

means for determining a first plurality of arrival times at the apparatus, based at least on the initial positioning measurements;

means for determining a second plurality of arrival times at the apparatus, based at least on the modified positioning measurements; and means determining a position of the user equipment based, at least in part, on the first plurality of arrival times and the second plurality of arrival.

25. The apparatus of claim 24 wherein the current cyclical period has a duration of a predetermined number of sub-frames $N_{PRS}$ which are grouped into a positioning occasion, in the transmission schedule.

26. The apparatus of claim 24 further comprising:

means for applying a test of interference to additional initial positioning measurements measured in one or more earlier cyclical periods, to identify the one or more interfering station(s) prior to the current cyclical period.

27. The apparatus of claim 26 wherein the test of interference comprises:

means for determining whether a signal-to-noise ratio of a positioning signal from a strongest station is greater than a first threshold; and means for determining whether another signal-to-noise ratio of another positioning signal from another station is less than a second threshold.

28. The apparatus of claim 24 wherein the means for mitigating the first plurality of tones of one or more interfering station(s) comprises:

means for scaling tones of the one or more interfering station(s), opposite to a direction used in symbol processing to obtain a plurality of unscaled tones;

means for rotating the plurality of unscaled tones in a direction inverse of symbol processing to obtain a plurality of unrotated tones;

means for scrambling the plurality of unrotated tones with a predetermined seed to obtain a plurality of reconstructed tones; and means for subtracting the plurality of reconstructed tones from positioning signals, to obtain the modified positioning measurements.

29. The apparatus of claim 24 wherein the means for estimating the first plurality of tones of one or more interfering station(s) comprises:

means for scaling each first tap of a vector of channel impulse response (CIR) of the initial positioning measurements, with relative signal strength over signal-plus-noise level, to obtain a windowed CIR vector;

means for comparing energy of each second tap of the windowed CIR vector with a predetermined noise threshold and zeroing out a specific second tap if the specific second tap does not exceed the predetermined noise threshold, to obtain a cleaned CIR vector;

means for setting to zero, a plurality of values in the cleaned CIR vector outside a window of a predetermined duration, the window being centered at a main peak in the cleaned CIR vector, to obtain a pruned CIR vector;

means for adding zero values to the pruned CIR vector that are sufficient in number, to obtain an improved CIR vector of a length determined by a predetermined fourier transform; and means for applying the predetermined fourier transform to the improved CIR vector, to obtain and store in memory the first plurality of tones of one or more interfering station(s).

30. The apparatus of claim 24 wherein the means for estimating the first plurality of tones of one or more interfering station(s) comprises:

means for searching for a peak in a vector of channel impulse response (CIR) of positioning signals;

means for aligning the peak to origin, by performing a circular shift using frequency domain channel response of positioning signals, to obtain an origin-centered CIR vector;

means for eliminating aliasing in the origin-centered CIR vector by frequency interpolation, to obtain an interpolated CIR vector;

means for scaling the interpolated CIR vector to overcome energy diminishment caused by zero tones, to obtain a scaled CIR vector; and means for performing on the scaled CIR vector, a reverse of the circular shift, to obtain and store in memory the first plurality of tones of one or more interfering station(s).

* * * * *